United States Patent
Lee et al.

(10) Patent No.: US 11,057,090 B2
(45) Date of Patent: Jul. 6, 2021

(54) METHOD FOR PAIRING WITH EXTERNAL DEVICE USING BEAM AND ELECTRONIC DEVICE THEREFOR

(71) Applicant: Samsung Electronics Co., Ltd., Gyeonggi-do (KR)

(72) Inventors: Jaehyuk Lee, Gyeonggi-do (KR); Nari Kim, Gyeonggi-do (KR); Mincheol Seo, Gyeonggi-do (KR); Junwhon Uhm, Gyeonggi-do (KR); Sungchul Park, Gyeonggi-do (KR); Jiyoon Park, Gyeonggi-do (KR); Yongsang Yun, Gyeonggi-do (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/838,199

(22) Filed: Apr. 2, 2020

(65) Prior Publication Data

US 2020/0322017 A1    Oct. 8, 2020

(30) Foreign Application Priority Data

Apr. 5, 2019 (KR) .................. 10-2019-0040163

(51) Int. Cl.
  *H04B 7/06* (2006.01)
  *H01Q 1/24* (2006.01)
  (Continued)

(52) U.S. Cl.
  CPC .......... *H04B 7/0617* (2013.01); *H01Q 1/246* (2013.01); *H04B 7/0408* (2013.01); *H04B 7/0695* (2013.01); *H04W 16/28* (2013.01)

(58) Field of Classification Search
  CPC .. H04B 7/0617; H04B 7/0695; H04B 7/0408; H04B 7/0639; H04B 7/088; H01Q 1/246; H01Q 21/08; H04W 16/28
  See application file for complete search history.

(56) References Cited

U.S. PATENT DOCUMENTS 10,176,783 B2    1/2019  Travers et al.
2013/0059619 A1  3/2013  Kim et al.
(Continued)

FOREIGN PATENT DOCUMENTS

KR    10-2012-0081340 A    7/2012
KR    10-2014-0029901 A    3/2014
(Continued)

OTHER PUBLICATIONS

International Search Report dated Jul. 8, 2020.

*Primary Examiner* — Kenneth T Lam
(74) *Attorney, Agent, or Firm* — Cha & Reiter, LLC

(57) ABSTRACT

A method and an apparatus for communicating with an external device using a beam in an electronic device supporting beamforming are provided. The electronic device includes a wireless communication circuitry, an antenna array including a plurality of antenna elements, and at least one processor. The processor may be configured to form and transmit a beam corresponding to a direction of the electronic device based on a start of a service, monitor reception of a response signal corresponding to the beam from an external device, and performs pairing with the external device based on at least a part of the response signal if the response signal is received.

18 Claims, 22 Drawing Sheets

(51) Int. Cl.
*H04W 16/28* (2009.01)
*H04B 7/0408* (2017.01)

(56) References Cited

U.S. PATENT DOCUMENTS

| | | | | |
|---|---|---|---|---|
| 2013/0203448 | A1* | 8/2013 | Kang | H04W 4/025 |
| | | | | 455/457 |
| 2013/0281026 | A1* | 10/2013 | Kim | H04B 7/0408 |
| | | | | 455/67.11 |
| 2014/0062854 | A1 | 3/2014 | Cho | |
| 2015/0181388 | A1* | 6/2015 | Smith | H04W 36/08 |
| | | | | 455/426.1 |
| 2016/0014722 | A1* | 1/2016 | Yoon | H04B 7/0617 |
| | | | | 455/426.1 |
| 2016/0150350 | A1* | 5/2016 | Ingale | H04W 12/08 |
| | | | | 370/255 |
| 2016/0198499 | A1* | 7/2016 | Lee | H04W 4/026 |
| | | | | 455/450 |
| 2017/0168566 | A1 | 6/2017 | Osterhout et al. | |
| 2018/0302138 | A1* | 10/2018 | Shirakata | H04B 7/0695 |
| 2020/0145998 | A1* | 5/2020 | Sun | H04B 7/088 |

FOREIGN PATENT DOCUMENTS

| | | |
|---|---|---|
| KR | 10-2016-0085191 A | 7/2016 |
| KR | 10-1644608 B1 | 8/2016 |
| KR | 10-1847400 B1 | 4/2018 |
| WO | 2014/107629 A1 | 7/2014 |

* cited by examiner

FIG. 17

| Sector 1 | Sector 2 | Sector 3 | Sector 4 | ... | ... | ... | ... |
|---|---|---|---|---|---|---|---|
| ... | ... | ... | ... | Sector x | ... | ... | ... |
| ... | ... | ... | ... | ... | ... | ... | ... |
| ... | ... | ... | ... | ... | ... | ... | ... |
| ... | ... | ... | ... | ... | ... | ... | ... |
| ... | ... | ... | ... | ... | ... | ... | Sector m |

METHOD FOR PAIRING WITH EXTERNAL DEVICE USING BEAM AND ELECTRONIC DEVICE THEREFOR

CROSS-REFERENCE TO RELATED APPLICATION

This application is based on and claims priority under 35 U.S.C. § 119 to Korean Patent Application No. 10-2019-0040163 filed on Apr. 5, 2019, in the Korean Intellectual Property Office, the disclosure of which is herein incorporated by reference in its entirety.

BACKGROUND

Field

One or more embodiments of the instant disclosure generally provide a method and an electronic device for pairing with an external device using a beam, where the electronic device supports beamforming.

Description of Related Art

Recently, as digital technology has developed, various types of electronic devices, such as smart phones, tablet personal computers (PCs), notebook computers, wearable devices, smart glasses (or head mounted displays (HMDs)), and personal computers, are now widely available. An electronic device may execute an application program using computing resources (e.g., processor and memory) provided in the electronic device, and it may provide the result (e.g., video and/or audio data) to a user.

As a new communication service, 5G (or 5G new radio (NR)) service is now being commercialized, and electronic devices have been developed to support 5G service. Such an electronic device may include a smart antenna (e.g., antenna array) implemented using a plurality of antennas for beamforming, and 5G service may also support beamforming. In other words, the electronic device supporting 5G service may include an antenna array, and the antenna array is implemented to support beamforming technology.

Meanwhile, currently there exists pairing methods for performing mutual interlocking and operation between electronic devices. In one such method an electronic device scans neighboring external devices when the user initiates the pairing operation, and provides schematic information (e.g., device names and device identification information) related to a plurality of scanned external devices to the user in the form of a list, and the user may select a target device based on the schematic information in the list.

Accordingly, the existing pairing method between electronic devices as described above may cause an inconvenience when the user performs the pairing operation, as the user may not be able to quickly identify the desired external device based on device name or identification information alone. Thus, such a method is unable to allow the user to intuitively select the target device, causing uncertainty for the user when he or she is selecting the target device.

SUMMARY

According to an embodiment of the disclosure, an electronic device may include a wireless communication circuitry configured to provide wireless communication; an antenna array including a plurality of antenna elements used for beamforming; and at least one processor operatively connected to the wireless communication circuitry and the antenna array, wherein the processor is configured to: form and transmit a beam corresponding to a direction of the electronic device based on a start of a service, monitor reception of a response signal corresponding to the beam from at least one external device, and perform pairing with the at least one external device based on at least a part of the response signal if the response signal is received.

According to an embodiment of the disclosure, a method for operating an electronic device including an antenna array for beamforming may include forming and transmitting a beam corresponding to a direction of the electronic device based on a start of a service; monitoring reception of a response signal corresponding to the beam from at least one external device; and performing pairing with the at least one external device based on at least a part of the response signal if the response signal is received.

According to one or more embodiments of the instant disclosure, to solve the above-described problems, a computer-readable recording medium recorded with a program for executing the above-described method through a processor may be included.

Various aspects or advantages of the instant disclosure that can be obtained in the instant disclosure are not limited to the above, and other unmentioned aspects can be clearly understood by those of ordinary skill in the art to which the disclosure pertains from the following description.

BRIEF DESCRIPTION OF THE DRAWINGS

The above and other aspects, features and advantages of certain embodiments of the disclosure will be more apparent from the following detailed description, taken in conjunction with the accompanying drawings, in which:

FIG. 17 is a diagram illustrating an example of divided sectors on a 2D plane, which may be displayed on a display of an electronic device according to an embodiment.

DETAILED DESCRIPTION

Certain embodiments of the instant disclosure disclose a method and an electronic device capable of pairing with a desired external device by intuitively specifying the corresponding external device using a beam, where the electronic device supports beamforming.

Certain embodiments of the instant disclosure disclose a method and an electronic device capable of performing beam-based pairing with an external device located in a direction desired by a user by controlling the beam toward the direction desired by the user, where the electronic device supports beamforming.

Certain embodiments of the disclosure disclose a method and an apparatus capable of configuring wireless communication with an external device that the user is looking at by transmitting a transmission (TX) beam in accordance with user's posture and/or user's eyesight direction and monitoring a reception (RX) beam corresponding to the transmission beam.

According to an electronic device and a method for operating the same disclosed herein, the electronic device supporting beamforming can automatically perform pairing with an external device located in a direction desired by a user by controlling a beam toward the direction desired by the user. According to an embodiment, all neighboring external devices are preferentially searched for generally using broadcasting techniques, and an external device desired by the user is intuitively specified without any complicated process of selecting the external device from a list. As such, the external device and the electronic device owned (e.g., carried or grasped) by the user are connected with each other more conveniently.

Figure 1:
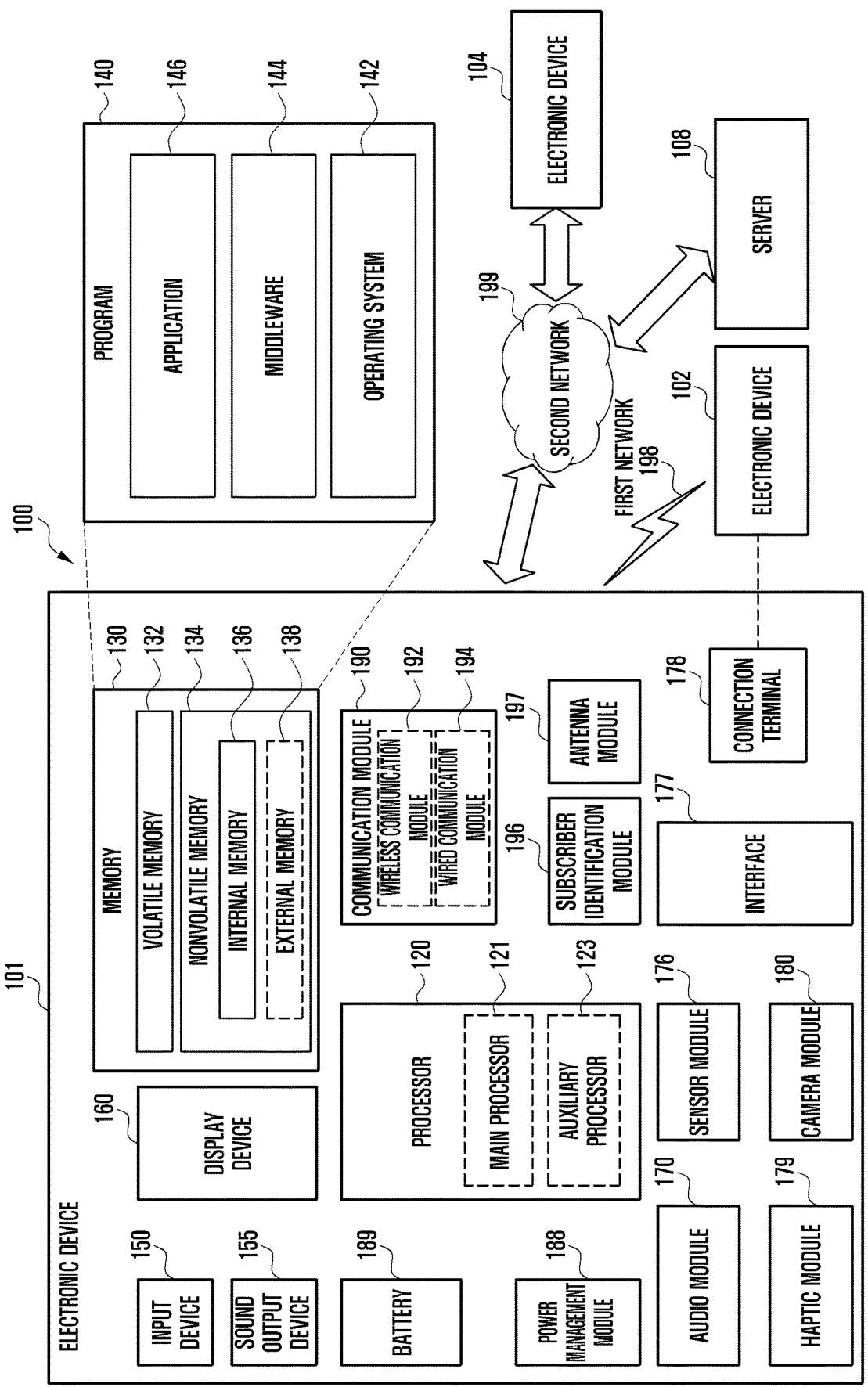
FIG. 1 illustrates an electronic device in a network environment according to an embodiment.

FIG. 1 illustrates an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), with an electronic device 104 or a server 108 via a second network 199 (e.g., a long-range wireless communication network), or with the electronic device 104 via the server 108, and may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) card 196, and an antenna module 197. At least one (e.g., the display device 160 or the camera module 180) of the components may be omitted from the electronic device 101, or one or more other components may be added in the electronic device 101. Some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. The processor 120 may load a command or data received from another component (e.g., the sensor module 176 or the communication module 190) in the volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101 and may include software (e.g., the program 140) and input data or output data for a command related thereto. The memory 130 may include the volatile memory 132 or the non-volatile memory 134.

The program 140 may be stored in the memory 130 as software, and may include an operating system (OS) 142, middleware 144, or an application 146.

The input device 150 may receive a command or data to be used by another component (e.g., the processor 120) of the electronic device 101, from the outside (e.g., a user) of the electronic device 101, and may include a microphone, a mouse, a keyboard, or a digital pen (e.g., a stylus pen).

The sound output device 155 may output sound signals to the outside of the electronic device 101 and may include a speaker or a receiver. The speaker may be used for general purposes, such as playing multimedia or playing record, and the receiver may be used for incoming calls and may be implemented as separate from, or as part of the speaker.

The display device 160 may visually provide information to the outside (e.g., a user) of the electronic device 101 and may include a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch. The audio module 170 may convert a sound into an electrical signal and vice versa, and may obtain the sound via the input device 150, or output the sound via the sound output device 155 or a headphone of an external electronic device (e.g., an electronic device 102) directly (e.g., over wires) or wirelessly coupled with the electronic device 101.

The sensor module 176 may detect an operational state (e.g., power or temperature) of the electronic device 101 or an environmental state (e.g., a state of a user) external to the electronic device 101, and generate an electrical signal or data value corresponding to the detected state, and may include a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., over wires) or wirelessly, and may include a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102), and may include a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation, and may include a motor, a piezoelectric element, or an electric stimulator.

The camera module 180 may capture a still image or moving images and may include one or more lenses, image sensors, image signal processors, or flashes.

The power management module 188 may manage power supplied to the electronic device 101, and may be implemented as at least part of a power management integrated circuit (PMIC).

The battery 189 may supply power to at least one component of the electronic device 101, and may include a primary cell which is not rechargeable, a secondary cell which is rechargeable, or a fuel cell.

The communication module 190 (e.g., a transceiver) may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101 and may include an antenna including a radiating element composed of a conductive material or a conductive pattern formed in or on a substrate (e.g., a printed circuit board (PCB)). The antenna module 197 may include a plurality of antennas. In such a case, at least one antenna appropriate for a communication scheme used in the communication network, such as the first network 198 or the second network 199, may be selected by the communication module 190 (e.g., the wireless communication module 192) from the plurality of antennas. The signal or the power may then be transmitted or received between the communication module 190 and the external electronic device via the selected at least one antenna. Another component (e.g., a radio-frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the electronic devices 102 and 104 may be a device of a same type as, or a different type, from the electronic device 101.

All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing, as at least part of a reply to the request. To that end, a cloud, distributed, or client-server computing technology may be used, for example.

The electronic device 101 according to embodiments may be one of various types of electronic devices, such as a portable communication device (e.g., a smartphone), a computer device, a portable multimedia device, a portable medical device, a camera, a wearable device, or a home appliance. However, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., over wires), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
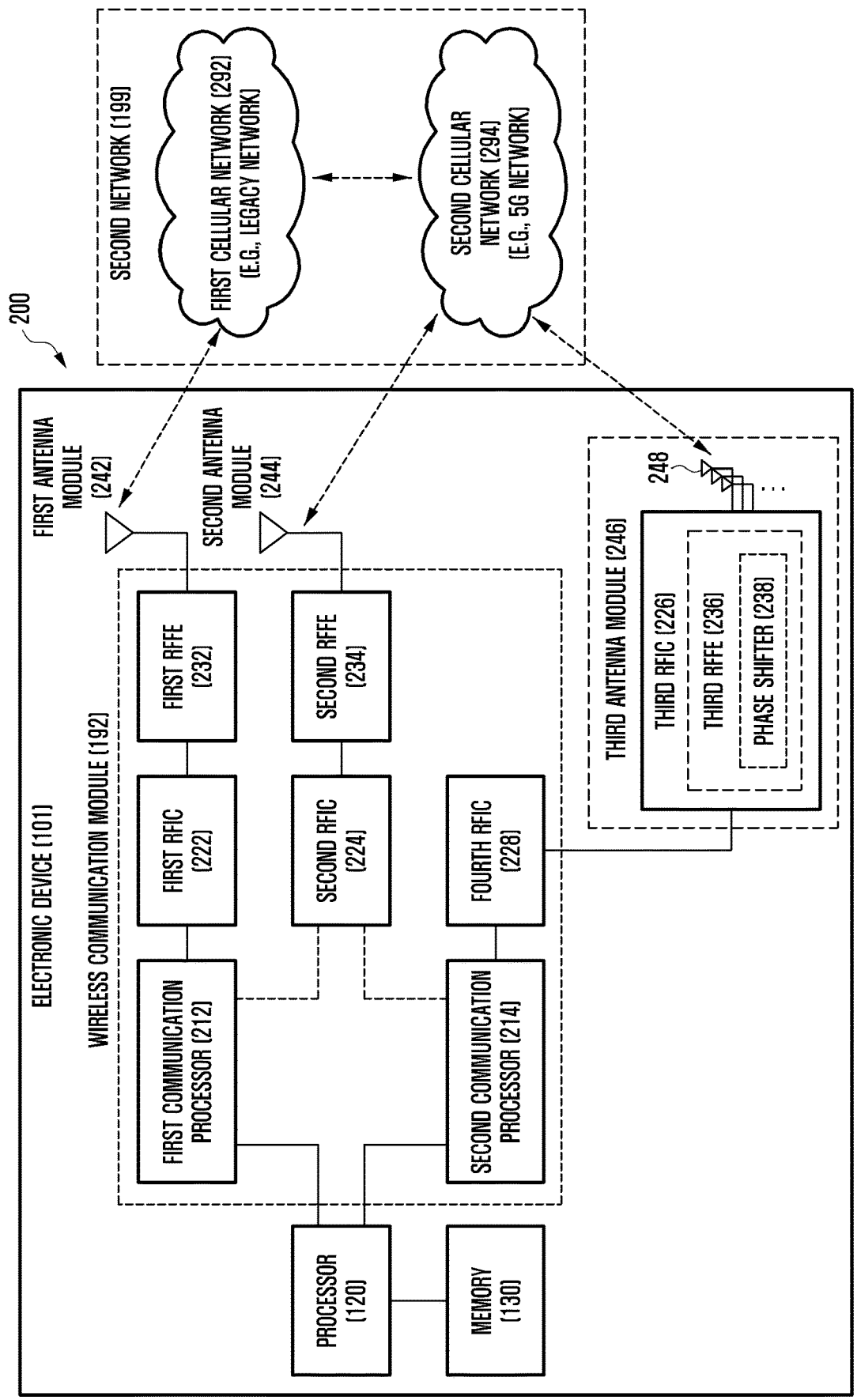
FIG. 2 illustrates an electronic device 101 for supporting legacy network communication and 5G network communication according to an embodiment.

FIG. 2 illustrates an electronic device 101 for supporting legacy network communication and 5G network communication according to an embodiment.

Referring to FIG. 2, the electronic device 101 may further include a first communication processor 212, a second communication processor 214, a first RFIC 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include a processor 120 and a memory 130.

The network 199 may include a first network 292 and a second network 294. The electronic device 101 may further include at least one of the components shown in FIG. 1, and the network 199 may further include at least another network. The first communication processor 212, the second communication processor 214, the first RFIC 222, the second RFIC 224, the fourth RFIC 228, the first RFFE 232, and the second RFFE 234 may constitute at least a part of the wireless communication module 192. The fourth RFIC 228 may be omitted, or may be included as a part of the third RFIC 226.

The first communication processor 212 may establish a communication channel in a band to be used for wireless communication with a first network 292, and may support legacy network communication through the established communication channel. The first network may be a legacy network including a second generation (2G), third generation (3G), fourth generation (4G), or long-term evolution (LTE) network.

The second communication processor 214 may establish a communication channel corresponding to a designated band (e.g. from about 6 GHz to about 60 GHz) among bands to be used for wireless communication with a second network 294, and may support 5G network communication through the established communication channel. The second network 294 may be a 5G network defined in the third generation partnership project (3GPP).

Additionally, the first communication processor 212 or the second communication processor 214 may establish a communication channel corresponding to another designated band (e.g. about 6 GHz or less) among bands to be used for wireless communication with the second network 294, and may support 5G network communication through the established communication channel. The first communication processor 212 and the second communication processor 214 may be implemented in a single chip or a single package together with the processor 120, the auxiliary processor 123, or the communication module 190.

At the time of signal transmission, the first RFIC 222 may convert a baseband signal generated by the first communication processor 212 into a radio-frequency (RF) signal of about 700 megahertz (MHz) to about 3 GHz used for the first network 292 (e.g. a legacy network). At the time of signal reception, the RF signal may be acquired from the first network 292 (e.g. a legacy network) through an antenna (e.g. the first antenna module 242), and may be preprocessed through RFFE (e.g. the first RFFE 232). The first RFIC 222 may convert the preprocessed RF signal into a baseband signal which can be processed by the first communication processor 212.

At the time of signal transmission, the second RFIC 224 may convert a baseband signal generated by the first communication processor 212 or the second communication processor 214 into an RF signal (hereinafter, a 5G Sub6 RF signal) of a Sub6 band (e.g. about 6 GHz or less) used for the second network 294 (e.g. a 5G network). At the time of signal reception, the 5G Sub6 RF signal may be acquired from the second network 294 (e.g. a 5G network) through an antenna (e.g. the second antenna module 244), and may be preprocessed through RFFE (e.g. the second RFFE 234). The second RFIC 224 may convert the preprocessed 5G Sub6 RF signal into a baseband signal which can be processed by a corresponding communication processor among the first communication processor 212 and the second communication processor 214.

The third RFIC 226 may convert a baseband signal generated by the second communication processor 214 into an RF signal (hereinafter, a 5G Above6 RF signal) of a 5G Above6 band (e.g. from about 6 GHz to about 60 GHz) to be used in the second network 294 (e.g. a 5G network). At the time of signal reception, the 5G Above6 RF signal may be acquired from the second network 294 (e.g. a 5G network) through an antenna (e.g. the antenna 248), and may be preprocessed through the third RFFE 236. The third RFIC 226 may convert the preprocessed 5G Above6 RF signal into a baseband signal that can be processed by the second communication processor 214. The third RFFE 236 may be configured as a part of the third RFIC 226.

The electronic device 101 may include the fourth RFIC 228 separately from the third RFIC 226 or as at least a part thereof. In this instance, the fourth RFIC 228 may convert a baseband signal generated by the second communication processor 214 into an RF signal (hereinafter, an intermediate-frequency (IF) signal) of an intermediate frequency band (e.g. from about 9 GHz to about 11 GHz) and may then transmit the IF signal to the third RFIC 226. The third RFIC 226 may convert the IF signal into a 5G Above6 RF signal. At the time of signal reception, the 5G Above6 RF signal may be received from the second network 294 (e.g. a 5G network) through an antenna (e.g. the antenna 248) and may be converted into an IF signal by the third RFIC 226. The fourth RFIC 228 may convert the IF signal into a baseband signal that can be processed by the second communication processor 214.

The first RFIC 222 and second RFIC 224 may be implemented as at least a part of a single package or a single chip. The first RFFE 232 and the second RFFE 234 may be implemented as at least a part of a single package or a single chip. At least one antenna module of the first antenna module 242 or the second antenna module 244 may be omitted, or may be combined with the other antenna module to process RF signals of multiple bands corresponding thereto.

The third RFIC 226 and antenna 248 may be arranged on the same substrate to constitute a third antenna module 246. For example, the wireless communication module 192 or the processor 120 may be arranged on a first substrate (e.g. a main PCB). In this instance, the third antenna module 246 may be configured by arranging the third RFIC 226 in a partial area (e.g. a lower surface) of a second substrate (e.g. a sub PCB) independent of the first substrate and arranging the antenna 248 in another partial area (e.g. an upper surface) thereof. Arranging the third RFIC 226 and the antenna 248 on the same substrate can reduce the length of a transmission line therebetween, and may reduce the loss (e.g. attenuation) of a signal in a high-frequency band (e.g. about 6 GH-about 60 GHz), used for 5G network communication, by a transmission line. Therefore, the electronic device 101 may exhibit an enhanced quality or speed of communication with the second network 294 (e.g. a 5G network).

The antenna 248 may be configured as an antenna array including multiple antenna elements which can be used for beamforming. In this instance, the third RFIC 226 may include, as a part of the third RFFE 236, multiple phase shifters 238 corresponding to the multiple antenna elements. At the time of signal transmission, the multiple phase shifters 238 may shift the phases of 5G Above6 RF signals to be transmitted from the electronic device 101 to an external device (e.g. a base station of a 5G network) through antenna elements corresponding thereto. At the time of signal reception, the multiple phase shifters 238 may shift the phases of 5G Above6 RF signals received from the outside through antenna elements corresponding thereto into an identical or substantially identical phase, thus enabling the transmission or reception through beamforming between the electronic device 101 and the outside.

The second network 294 (e.g. a 5G network) may be operated independently of the first network 292 (e.g. a legacy network) (e.g. stand-alone (SA)) or may be operated while being connected to the first network (e.g. non-standalone (NSA)). For example, the 5G network may include only an access network (e.g. a 5G radio access network (RAN) or next-generation RAN (NG RAN)) and may not include a core network (e.g. a next-generation core (NGC)). In this instance, the electronic device 101 may access an access network of a 5G network and may then access an external network (e.g. Internet) under the control of a core network (e.g. an evolved packed core (EPC) network) of a legacy network. Protocol information (e.g. LTE protocol information) for communication with the legacy network or protocol information (e.g. new radio (NR) protocol information) for communication with the 5G network are stored in a memory 230, and may be accessed by another component (e.g. the processor 120, the first communication processor 212, or the second communication processor 214).

Figure 3:
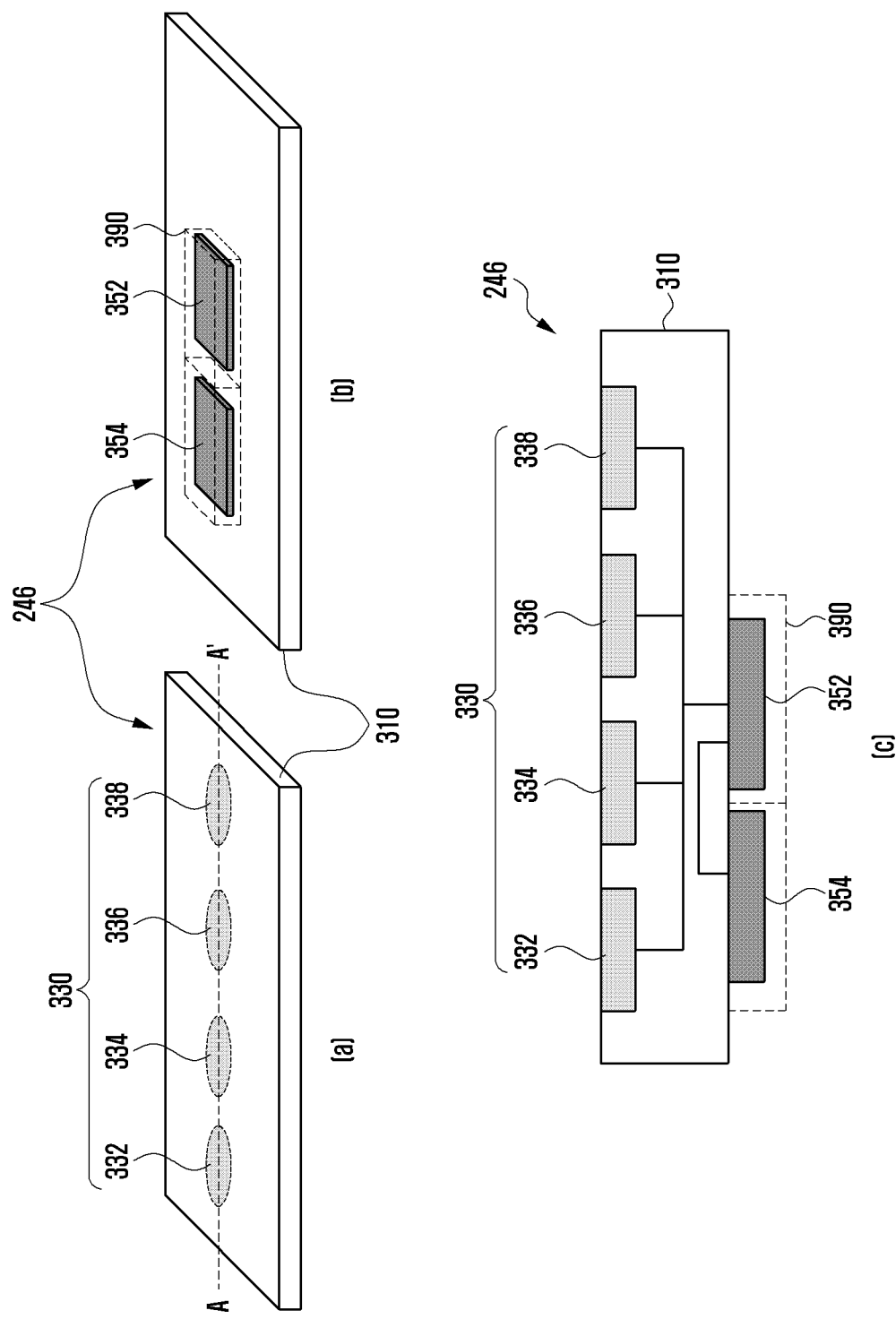
FIG. 3 illustrates the structure of an antenna module according to an embodiment.

FIG. 3 illustrates the structure of an antenna module according to an embodiment.

For example, FIG. 3 illustrates an embodiment of the structure of the third antenna module 246 described with reference to FIG. 2. Example (a) of FIG. 3 is a perspective view of the third antenna module 246, seen from an upper side at elements 330, example (b) of FIG. 3 is a perspective view of the third antenna module 246, seen from a lower side at elements 352 and 354, and example (c) of FIG. 3 is a cross sectional view perspective view taken along A-A' of the third antenna module 246.

Referring to FIG. 3, the third antenna module 246 may include a PCB 310, an antenna array 330, an RFIC 352, a PMIC 354, and a module interface. The third antenna module 246 may further include a shielding member 390. At least one among the above-described components may be omitted, or at least two of the components may be integrally formed.

The PCB 310 may include multiple conductive layers and multiple non-conductive layers alternately laminated with the conductive layers. The PCB 310 may provide an electrical connection between various electronic components arranged on and/or outside the PCB 310 by using conductive vias and wires formed on the conductive layers.

The antenna array 330 may include multiple antenna elements 332, 334, 336, and 338 arranged on a first surface of the PCB 310 so as to form a directional beam. The antenna array 330 may be disposed inside the PCB 310, and may include antenna arrays of the same or different shapes or types (e.g. a dipole antenna array and/or a patch antenna array).

The RFIC 352 may be disposed in another area of the PCB 310 (a second surface opposite the first surface), spaced apart from the antenna array. The RFIC 352 is configured to be able to process a signal in a selected frequency band, transmitted/received through the antenna array 330. At the time of signal transmission, the RFIC 352 may convert a baseband signal acquired from a communication processor into an RF signal in a designated band. At the time of signal reception, the RFIC 352 may convert an RF signal received through the antenna array 330 into a baseband signal and transmit the baseband signal to the communication processor.

According to another embodiment, at the time of signal transmission, the RFIC 352 may up-convert an IF signal (e.g. from about 9 GHz to about 11 GHz) acquired from an intermediate frequency integrated circuit (IFIC) (e.g. the fourth RFIC 228 in FIG. 2) into an RF signal in a selected band. Upon the signal reception, the RFIC 352 may down-convert an RF signal acquired through the antenna array 330 into an IF signal and transmit the IF signal to the IFIC.

The PMIC 354 may be disposed in another partial area (e.g. the second surface) of the PCB 310, spaced apart from the antenna array 330, may receive a voltage from a main substrate (main PCB), and may provide power necessary for various components on the antenna module.

The shielding member 390, which may include a shield can, may be disposed on a part (e.g. the second surface surface) of the PCB 310 so as to electromagnetically shield at least one of the RFIC 352 or the PMIC 354. The third antenna module 246 may be electrically connected to the main circuit board through a module interface that may include a connection member (for example, a coaxial cable connector, a board-to-board (B2B) connector, an interposer, or an FPCB). The RFIC 352 and/or the PMIC 354 of the antenna module 246 may be electrically connected to the PCB 310 through the connection member.

Figure 4:
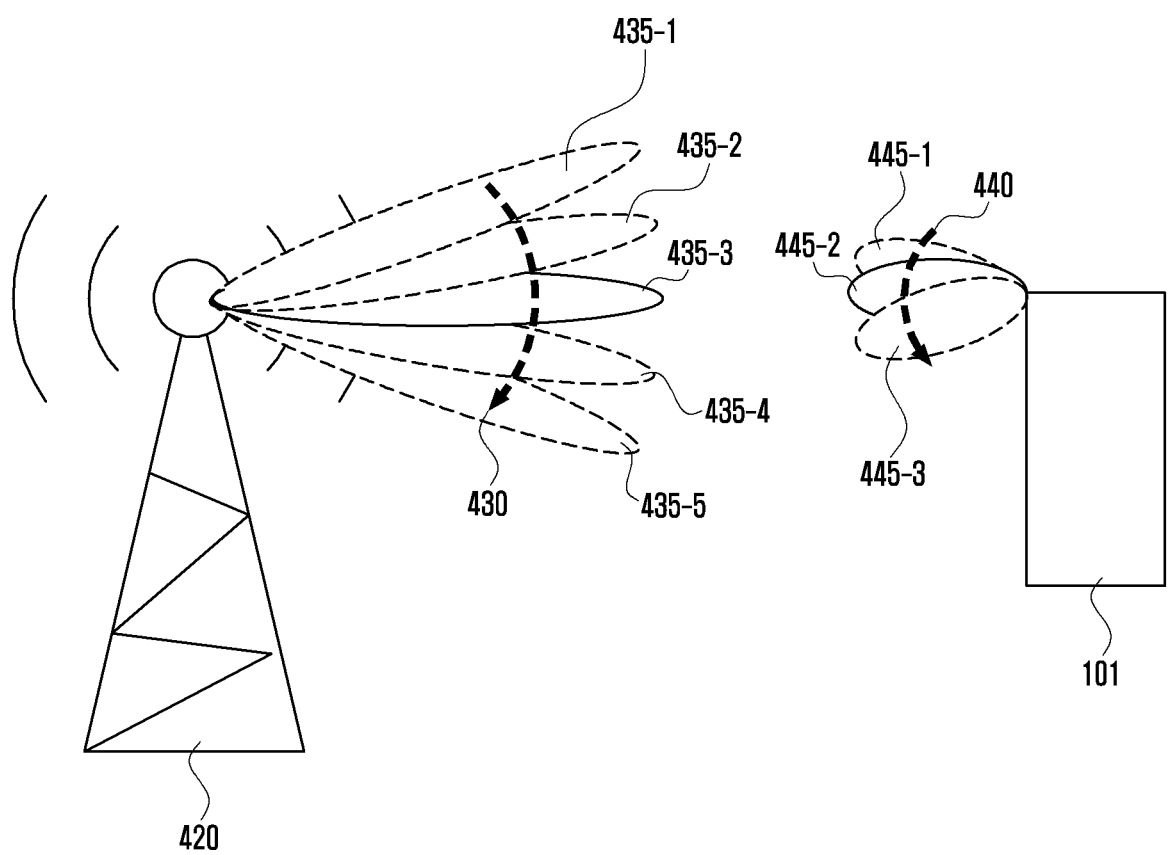
FIG. 4 is a diagram illustrating an example operation for wireless communication connection between a base station and an electronic device in a 5G network, which uses a directional beam for wireless connection.

FIG. 4 is a diagram illustrating example operation for wireless communication connection between a base station 420 and the electronic device 101 in the second network 294 (e.g., 5G network) illustrated in FIG. 2, which uses a directional beam for wireless connection.

The base station (gNodeB (gNB), transmission reception point (TRP)) 420 may perform a beam detection operation together with the electronic device 101 for the wireless communication connection. In the example embodiment illustrated in FIG. 4, for beam detection, the base station 420 may perform transmission beam sweeping 430 at least one time by sequentially transmitting a plurality of transmission beams, for example, first to fifth transmission beams 435-1, 435-2, 435-3, 435-4, 435-5 (which may be referred to hereinafter as transmission beams 435-1 to 435-5), which are oriented in different directions.

Each of the first to fifth transmission beams 435-1 to 435-5 may include, for example, at least one synchronization sequences (SS)/physical broadcast channel (PBCH) block (SS/PBCH block). The SS/PBCH block may be used to periodically measure the strength of a channel or a beam of the electronic device 101.

In another embodiment, each of the first to fifth transmission beams 435-1 to 435-5 may include at least one channel state information-reference signal (CSI-RS). A CSI-RS may refer, for example, to a reference signal that may flexibly be configured by the base station 420, and may be transmitted periodically/semi-persistently or aperiodically. The electronic device 101 may measure the intensities of a channel and a beam using the CSI-RS.

The transmission beams may have a radiation pattern having a selected beam width. For example, each of the transmission beams may have a broad radiation pattern having a first beam width, or a sharp radiation pattern having a second beam width smaller than the first beam width. For example, transmission beams including a SS/PBCH block may have a radiation pattern wider than that of transmission beams including a CSI-RS.

The electronic device 101 may perform reception beam sweeping 440 while the base station 420 is performing transmission beam sweeping 430. For example, while the base station 420 is performing first transmission beam sweeping 430, the electronic device 101 may fix a first reception beam 445-1 in a first direction to receive a signal of a SS/PBCH block transmitted by at least one of the first to fifth transmission beams 435-1 to 435-5. While the base station 420 is performing second transmission beam sweeping 430, the electronic device 101 may fix a second reception beam 445-2 in a second direction to receive a signal of a SS/PBCH block transmitted by the first to fifth transmission beams 435-1 to 435-5. While the base station 420 is performing third transmission beam sweeping 430, the electronic device 101 may fix a third reception beam 445-3 in a third direction to receive a signal of a SS/PBCH block transmitted by the first to fifth transmission beams 435-1 to 435-5. As described above, the electronic device 101 may select a communication-enabled reception beam (e.g., second reception beam 445-2) and a communication-enabled transmission beam (e.g., third transmission beam 435-3), based on a result of a signal receiving operation through reception beam sweeping 440.

Based on the communication-enabled transmission/reception beams being determined, the base station 420 and the electronic device 101 may transmit and/or receive pieces of basic information for cell configuration and configure information for additional beam management, based on the pieces of basic information. For example, the beam management information may include detailed information of a configured beam, and configuration information of a SS/PBCH block, CSI-RS, or additional reference signal.

In addition, the electronic device 101 may consistently monitor the intensities of a channel and a beam using at least one of a SS/PBCH block and a CSI-RS included in a transmission beam. The electronic device 101 may adaptively select a beam having good quality using the monitoring operation. If the electronic device 101 is moved or beams are blocked whereby communication is disconnected, the beam sweeping operation may be re-performed to determine a communication-enabled beam.

Figure 5:
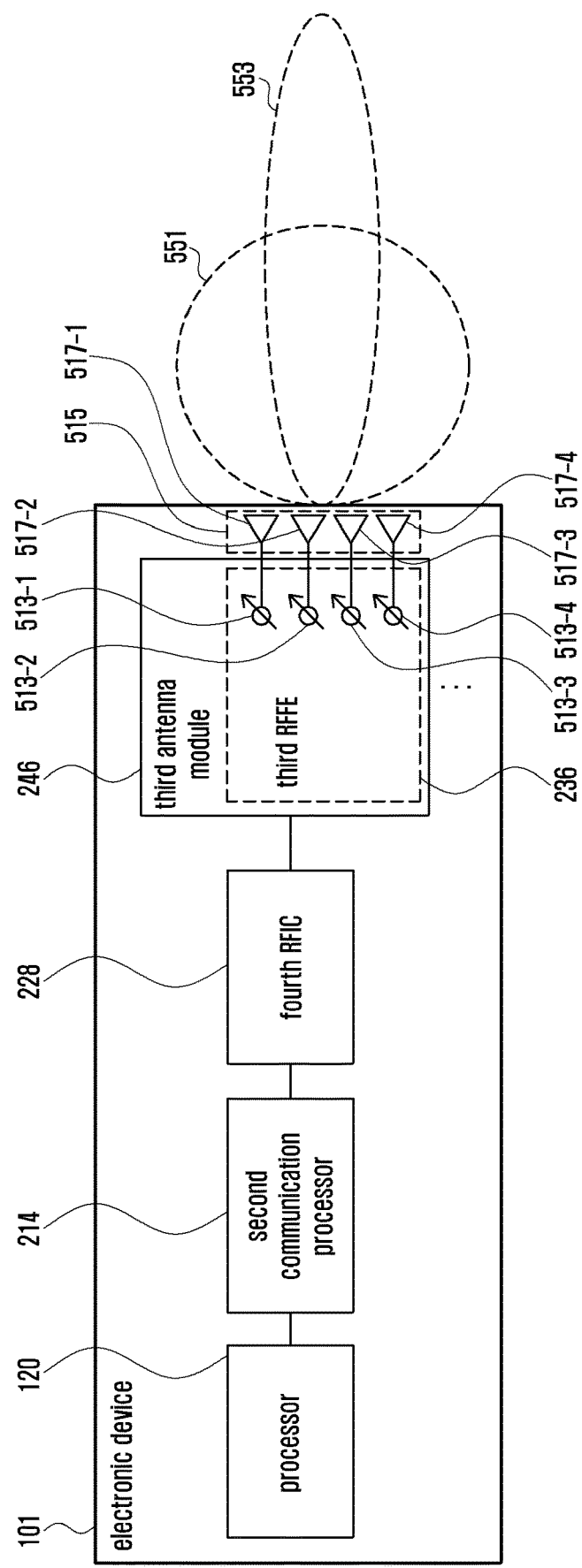
FIG. 5 is a block diagram illustrating an example electronic device for 5G network communication according to an embodiment.

FIG. 5 is a block diagram illustrating an example electronic device 101 for 5G network communication according to an embodiment.

The electronic device 101 may include various components illustrated in FIG. 2.

However, FIG. 5 illustrates, for a brief description, the electronic device including a processor (e.g., including processing circuitry) 120, a second communication processor (e.g., including processing circuitry) 214, a fourth RFIC 228, and at least one third antenna module 246.

In an embodiment illustrated in FIG. 5, the third antenna module 246 may include first, second, third and fourth phase shifters 513-1, 513-2, 513-3, 513-4 (which may be referred to hereinafter as first to fourth phase shifters 513-1 to 513-4) (e.g., phase shifter 238 illustrated in FIG. 2) and/or first, second, third and fourth antenna elements 517-1, 517-2, 517-3, 517-4 (which may be referred to hereinafter as first to fourth antenna elements 517-1 to 517-4) (e.g., antenna 248 illustrated in FIG. 2). Each of the first to fourth antenna elements 517-1 to 517-4 may electrically be connected to each of the first to fourth phase shifters 513-1 to 513-4. The first to fourth antenna elements 517-1 to 517-4 may form at least one antenna array 515.

The second communication processor 214 may include various processing circuitry and control the first to fourth phase shifters 513-1 to 513-4 to control the phases of signals transmitted and/or received through the first to fourth antenna elements 517-1 to 517-4 and accordingly generate a transmission beam and/or a reception beam in a selected direction.

According to an embodiment, the third antenna module 246 may generate a broad radiation pattern beam 551 (hereinafter, "broad beam") or a sharp (e.g., relatively narrower than the broad beam) radiation pattern beam 553 (hereinafter, "sharp beam") as described above, according to the number of the used antenna elements. For example, the third antenna module 246 may generate a sharp beam 553 using all of the first to fourth antenna elements 517-1 to 517-4, and may generate a broad beam 551 using only the first antenna element 517-1 and the second antenna element 517-2. The broad beam 551 may have a wider coverage than the sharp beam 553 but has a smaller antenna gain than the sharp beam 553 and thus can be more effectively used for beam searching. On the other hand, the sharp beam 553 may have a narrower coverage than the broad beam 551 but a higher antenna gain than the broad beam 551 and thus can improve communication performance.

According to an embodiment, the second communication processor 214 may include various processing circuitry and may utilize a sensor module 176 (e.g., 9-axis sensor, grip sensor, or GPS) for beam searching. For example, the electronic device 101 may use the sensor module 176 to adjust a beam searching location and/or a beam searching cycle, based on a location and/or a movement of the electronic device 101. According to another example, if the electronic device 101 is held by a user, a grip sensor is used to identify the portion held by the user, whereby an antenna module having better communication performance among a plurality of third antenna modules 246 may be selected.

An electronic device 101 according to an embodiment of the disclosure may include a wireless communication circuitry (e.g., wireless communication module 192 of FIG. 1 or 2) configured to provide wireless communication, an antenna array (e.g., antenna 248 of FIG. 2, antenna array 330 of FIG. 3, or antenna array 515 of FIG. 5) including a plurality of antenna elements used for beamforming, and at least one processor 120 operatively connected to the wireless communication circuitry 192 and the antenna array, wherein the processor 120 forms and transmits a beam corresponding to a direction of the electronic device 101 based on a start of a service, monitors reception of a response signal corresponding to the beam from at least one external device, and performs pairing with the at least one external device based on at least a part of the response signal if the response signal is received.

According to an embodiment of the disclosure, the processor 120 may form the beam at least based on a direction and an intensity of the beam initially set during the start of the service.

According to an embodiment of the disclosure, the processor 120 may acquire address information related to the at least one external device from the response signal, and perform the pairing with the at least one external device based on the address information.

According to an embodiment of the disclosure, the processor 120 may change a direction or an intensity of the beam at least based on the response signal.

According to an embodiment of the disclosure, the processor 120 may change at least a part of a direction and an intensity of the beam if the response signal is not received from the at least one external device within a predetermined time after transmitting the beam.

According to an embodiment of the disclosure, the processor 120 may change at least a part of a direction or an intensity of the beam based on a user designation.

According to an embodiment of the disclosure, the electronic device 101 may include a display (e.g., display device 160 of FIG. 1), and the processor 120 may provide a plurality of sectors on the display, acquire a user designation to select a sector among the plurality of sectors, and form the beam based on a beam ID allocated to the sector.

According to an embodiment of the disclosure, the processor 120 may allocate a sector number and an antenna element for each of the plurality of sectors on a two-dimensional (2D) plane that can be displayed on the display, and form the beam to have a direction corresponding to the sector number and the antenna element of the sector selected by the user designation.

According to an embodiment of the disclosure, the processor 120 may acquire a reception beam corresponding to the response signal transmitted from the at least one external device, determine a state of the reception beam, and scan for another external device if the state of the reception beam fails to meet a designated condition.

According to an embodiment of the disclosure, the processor 120 may scan for the other external device based on beam sweeping.

According to an embodiment of the disclosure, the processor 120 may transmit the beam in a front direction in which the electronic device 101 is directed, perform the beam sweeping if there is no response corresponding to the beam, and perform pairing with the other external device if a response is acquired from the other external device during the beam sweeping in response to a transmission beam transmitted during the beam sweeping, wherein the other external device is in a direction of the transmission beam.

According to an embodiment of the disclosure, the processor 120 may display a preview image corresponding to the direction of the electronic device 101 on a display of the electronic device 101 based on the start of the service, identify an object related to the at least one external device in a direction of a user's eyesight based on the preview image, form a first beam in a first direction with a first width if the identified object is a single object, and form a second beam in a second direction with a second width if the identified object corresponds to multiple objects.

According to an embodiment of the disclosure, a radiation pattern of the first beam may be relatively narrow compared to the second beam.

According to an embodiment of the disclosure, the electronic device 101 may be smart glasses (e.g., smart glasses 1500 of FIG. 15) including the antenna array and a display.

According to an embodiment of the disclosure, the electronic device 101 may be a smart phone (e.g., smart phone 1600 of FIG. 16) including the antenna array, a display, and a camera module (e.g., camera module 180 of FIG. 1).

Hereinafter, a method for operating an electronic device 101 according to an embodiment will be described in detail. According to an embodiment, operations performed by the electronic device 101 to be described hereinafter may be executed by at least one processor (e.g., at least one processor including a processing circuit, and for example, processor 120 of FIG. 1) of the electronic device 101. According to an embodiment, the operations performed by the electronic device 101 are stored in a memory (e.g., memory 130 of FIG. 1), and when executed, they may be instructions that are executed by the processor 120. The processor 120 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. § 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

Figure 6:
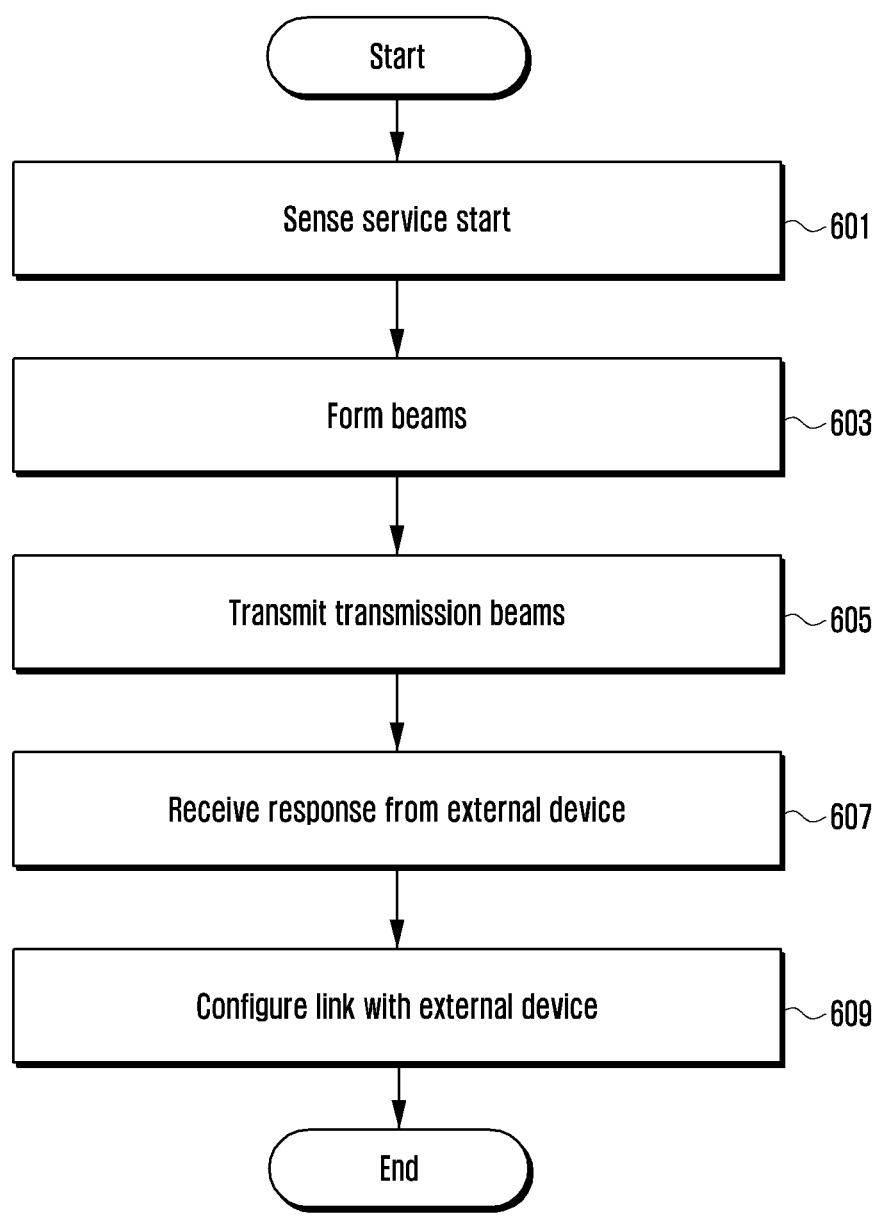
FIG. 6 is a flowchart illustrating a method for operating an electronic device according to an embodiment.
Figure 7A:
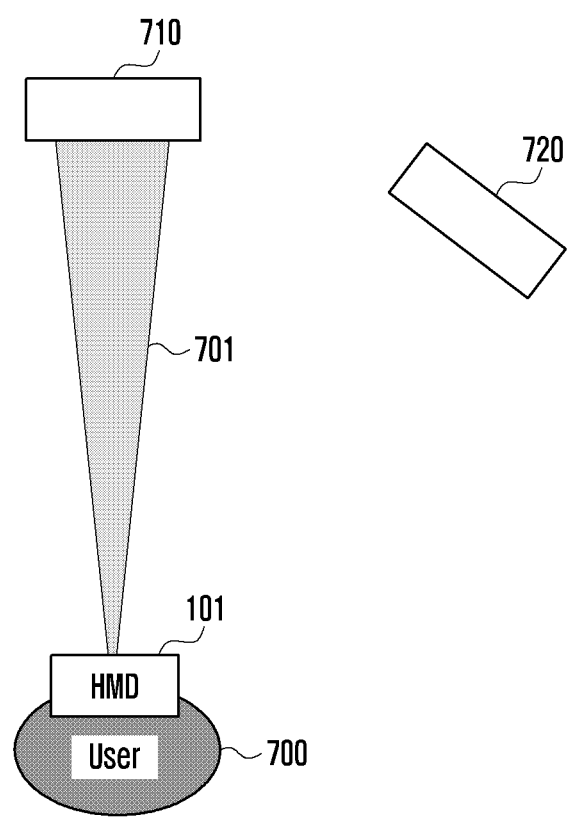
FIG. 7A is a diagram explaining an operation between an electronic device and an external device according to an embodiment.
Figure 7B:
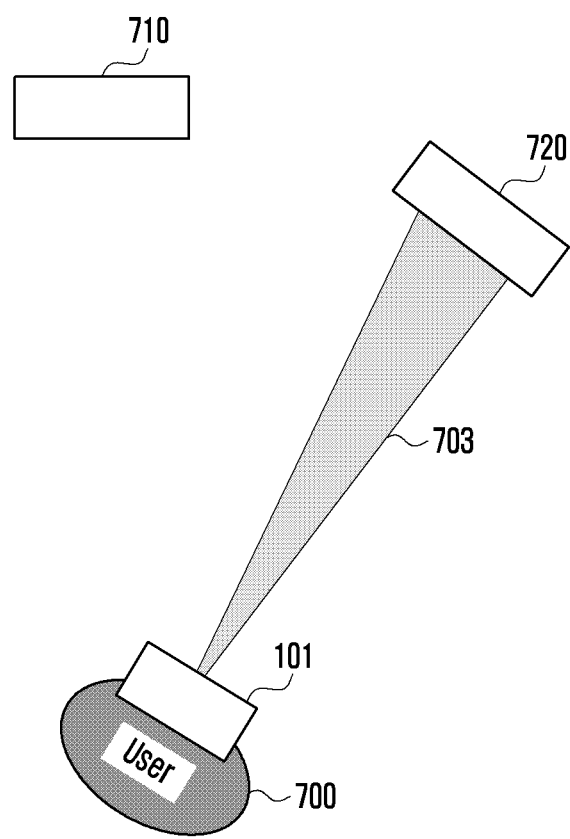
FIG. 7B is a diagram explaining an operation between an electronic device and an external device according to an embodiment.

FIG. 6 is a flowchart illustrating a method for operating an electronic device according to an embodiment. FIGS. 7A and 7B are diagrams explaining an operation between an electronic device and an external device according to an embodiment.

According to an embodiment, with reference to FIGS. 6, 7A, and 7B, an example in which the electronic device 101, which supports beamforming, is performing pairing with an external device using a beam will be described.

With reference to FIG. 6, at operation 601, the processor 120 of the electronic device 101 may sense a start of a service. In an embodiment, the term "service" may indicate, for example, a service (or function or application) related to when the electronic device is to perform pairing with an external device. According to an embodiment, the service may be started by a user-intended (or explicit) service start input (e.g., when the user initiates a pairing function or application), may be automatically started by the electronic device 101 based on various pieces of situation information (sensing information), or may be automatically started when the electronic device 101 is powered on (e.g., power-on of the smart glasses (or HMD)). For example, the service may be started in a specific place (or location or space) based on the user's setup related to the electronic device 101, may be started based on an execution of a user-specified function (or application), or may be started by the electronic device 101 based on detection of a designated specific posture (e.g. location or motion) of the electronic device 101. According to an embodiment, the user's service start input may include various inputs, such as touch input, function button (e.g., hardware button) input, voice input, and/or designated gesture input (e.g., posture or motion change of the electronic device 101).

At operation 603, the processor 120 may determine a beam direction. According to an embodiment, the processor 120 may determine an initial setup condition related to the beam based on sensing of the service start. In an embodiment, the initial setup condition may include, for example, conditions for forming (using) the beam set with the direction (or view direction) of the electronic device 101 corresponding to a user's eyesight direction, specific angle (e.g., beam direction), specific intensity (e.g., beam intensity), and/or specific width (e.g., beam width). For example, in a 5G system, beamforming technology may be used to overcome high signal attenuation in transmitting and receiving signals in the mmWave frequency band. The beamforming technology may also be used for signal transmission/reception in the electronic device 101. The electronic device 101 may create various beams through phase changes in the antenna array (e.g., antenna 248 of FIG. 2, antenna array 330 of FIG. 3, or antenna array 515 of FIG. 5), and there may be several best beams for transmitting signals from the electronic device 101 to the external device (e.g., another electronic device).

According to an embodiment, with reference to FIGS. 7A and 7B, in this example, the electronic device 101 is a pair of smart glasses (or HMD) that can be mounted on the head of a user 700, and an initial setup beam (e.g., beam based on an initial setup condition) is formed based on the user's direction. The initial setup beam has a direction (e.g., eyesight direction) in line with the direction of the electronic device 101 as it is worn by the user, a specific angle, and a specific intensity. As illustrated in FIGS. 7A and 7B, the electronic device 101 may determine a beam formed with the specific angle and the specific intensity in accordance with the initial setup condition. The beam may have a narrow width in a view direction of the user as he or she is wearing the electronic device 101. Alternatively, if the electronic device 101 is a smart phone, as the user is holding the smart phone to look at its front display, the electronic device 101 may project a beam in a direction opposite the direction of the front display. The beam may be generated using a communication module (e.g., wireless communication module (e.g., mmWave antenna module) 192 of FIG. 1 or FIG. 2). For example, an environment in which a first external device 710 and a second external device 720 exist around the electronic device 101 (or user 700) may be assumed. As an example, if the user desires communication (e.g., pairing) with the first external device 710, as shown in FIG. 7A, the user may point the electronic device 101 toward the first external device 710, and the electronic device 101 may form a beam 701 in a direction toward first external device 710. As another example, if the user desires communication (e.g., pairing) with the second external device 720, as shown in FIG. 7B, the user may point the electronic device 101 toward the second external device 720, and the electronic device 101 may form a beam 703 in a direction toward the second external device 720. According to an embodiment, as exemplified in FIG. 7A or 7B, the user 700 can intuitively select an external device for communication or pairing by simply pointing the electronic device 101 toward the corresponding external device (e.g., 710 or 720).

At operation 605, the processor 120 may transmit a transmission (TX) beam to the external device. According to an embodiment, the processor 120 may transmit the transmission beam based on the determined beam direction. According to an embodiment, the processor 120 may transmit the transmission beam based on the direction of the electronic device 101 (e.g., posture and eyesight direction of the user 700), and it may monitor a reception (RX) beam that is transmitted in turn based on the transmission of the transmission beam. According to an embodiment, the processor 120 may transfer a wakeup signal to the external device subject to initiate pairing based on the transmission beam. For example, when forming the beam, the external device may feed information necessary for the pairing (e.g., device identifier and/or address information) (or channel information) to the electronic device 101, and the processor 120 may use the wireless communication module to transmit the wakeup signal on the transmission beam.

At operation 607, the processor 120 may receive a response from the external device. According to an embodiment, the processor 120 may monitor the reception (RX) beam from the external device after the transmission of the transmission beam, and it may receive a response signal from the external device based on the result of the monitoring. According to an embodiment, the external device (e.g., first external device 710 of FIG. 7A or second external device 720 of FIG. 7B) that receives the transmission beam from the electronic device 101 may transmit the response signal corresponding to the transmission beam of the electronic device 101 to the electronic device 101. For example, in the case of receiving the transmission beam from the electronic device 101, the external device may transmit the response signal to the electronic device 101 using the received beam, and it may include information for communication (e.g., pairing) setup (e.g., device identifier and/or address information) in the response signal.

At operation 609, the processor 120 may set up a link to pair with the external device. For example, the processor 120 may identify the address information of the external device based on the response signal, and it may set up a communication link with the corresponding external device based on the identified address information. In an embodiment, the external device that sets up the communication link may be a device that the user is looking toward. Thus, the user may intuitively set up communication connection between the electronic device 101 and the external device and would not have to go through a separate procedure for pairing, such as selecting the external device from a list shown on a user interface.

Figure 8:
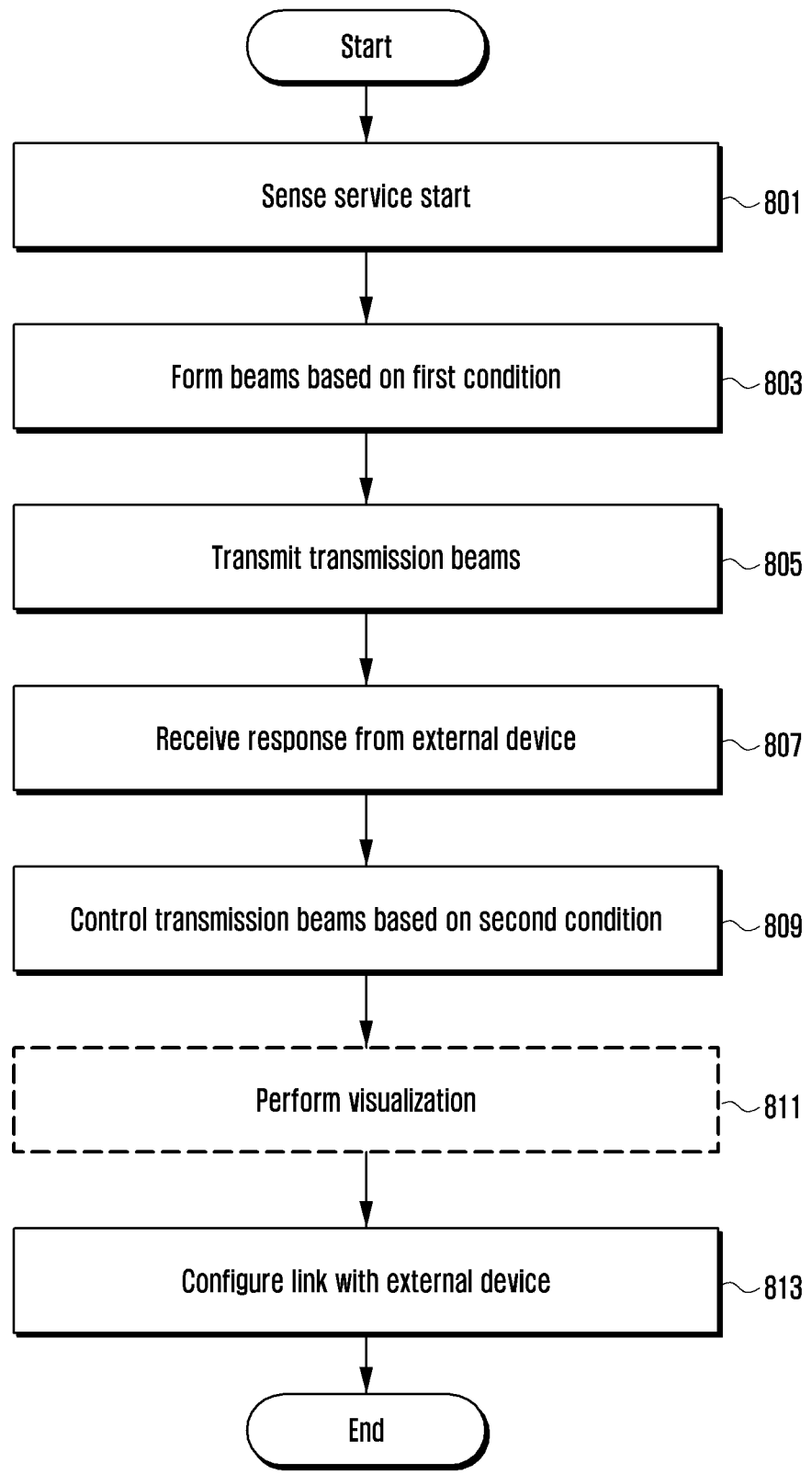
FIG. 8 is a flowchart illustrating a method for operating an electronic device according to an embodiment.

FIG. 8 is a flowchart illustrating a method for operating an electronic device according to an embodiment.

According to an embodiment, FIG. 8 may show an operational example in which the electronic device 101 that transmits the transmission beam adjusts the direction and the intensity of the transmission beam based on the response of the external device. In this particular example, the electronic device 101 adjusts the beamforming based on the communication state with the external device.

With reference to FIG. 8, at operation 801, the processor 120 of the electronic device 101 may sense a start of a service. In an embodiment, the term "service" may indicate, for example, a service (or function) related to when the electronic device 101 is to perform pairing with the external device. According to an embodiment, the service may be started by a user-intended (or explicit) service start input (e.g., when the user initiates a pairing function or application), may be automatically started by the electronic device 101 based on various pieces of situation information (sensing information), or may be automatically started when the electronic device 101 is powered on (e.g., power-on of the smart glasses (or HMD)).

At operation 803, the processor 120 may form the beam based on a first condition. In an embodiment, the first condition may include an initial setup condition. For example, the processor 120 may determine the initial setup condition related to the beam based on the sensing of the service start. In an embodiment, the initial setup condition may include, for example, the direction (or view direction) of the electronic device 101 corresponding to the user's eyesight direction, specific angle (e.g., beam direction), specific intensity (e.g., beam intensity), and/or specific width (e.g., beam width).

At operation 805, the processor 120 may transmit the transmission (TX) beam to the external device. According to an embodiment, the processor 120 may transmit the transmission beam based on the direction of the electronic device 101, and it may monitor the reception (RX) beam that is transmitted in turn based on the transmission of the transmission beam. According to an embodiment, when forming the beam, the external device may feed information necessary for the pairing (e.g., device identifier and/or address information) (or channel information) to the electronic device 101, and the processor 120 may use the wireless communication module to transmit the wakeup signal on the transmission beam.

At operation 807, the processor 120 may receive a response from the external device. According to an embodiment, the processor 120 may monitor the reception (RX) beam from the external device after the transmission of the transmission beam, and it may receive a response signal from the external device based on the result of the monitoring. According to an embodiment, the external device that receives the transmission beam from the electronic device 101 may transmit the response signal corresponding to the transmission beam of the electronic device 101 to the electronic device 101. For example, in the case of receiving the transmission beam from the electronic device 101, the external device may transmit the response signal to the electronic device 101 using the received beam, and it may include information for communication (e.g., pairing) setup (e.g., device identifier and/or address information) in the response signal.

At operation 809, the processor 120 may control the transmission beam based on a second condition in accordance with the response signal. According to an embodiment, the second condition may include a condition for changing the transmission beam for an additional operation (e.g., command transmission and reception for controlling the external device) based on the response signal received from the external device. For example, based on the second condition, the processor 120 may adjust the beam intensity and/or beam width of the transmission beam that were initially set in accordance with the first condition. As an example, the processor 120 may adjust the transmission beam to sharpen the transmission beam as compared with the transmission beam of the first condition.

At operation 811, the processor 120 may perform visualization. According to an embodiment, operation 811 is an optional operation, and it may not be performed. For example, if the response signal corresponding to the transmission beam is received from the external device, the processor 120 may visualize (render) the adjustment of the beam intensity and/or beam width based on the response signal, and it may display the result of the adjustment through the display (e.g., display device 160 of FIG. 1) to provide the result of the adjustment to the user. At operation 813, the processor 120 may set up a link to pair with the external device. For example, the processor 120 may identify the address information of the external device based on the response signal, and it may set up a communication link (e.g., pairing) with the corresponding external device based on the identified address information. In an embodiment, the external device that sets up the communication link may be a device that the user is looking toward. Thus, the user may intuitively set up communication connection (e.g., pairing) between the electronic device 101 and the external device and would not have to go through any separate procedure for pairing between the electronic device 101 and the external device.

Figure 9:
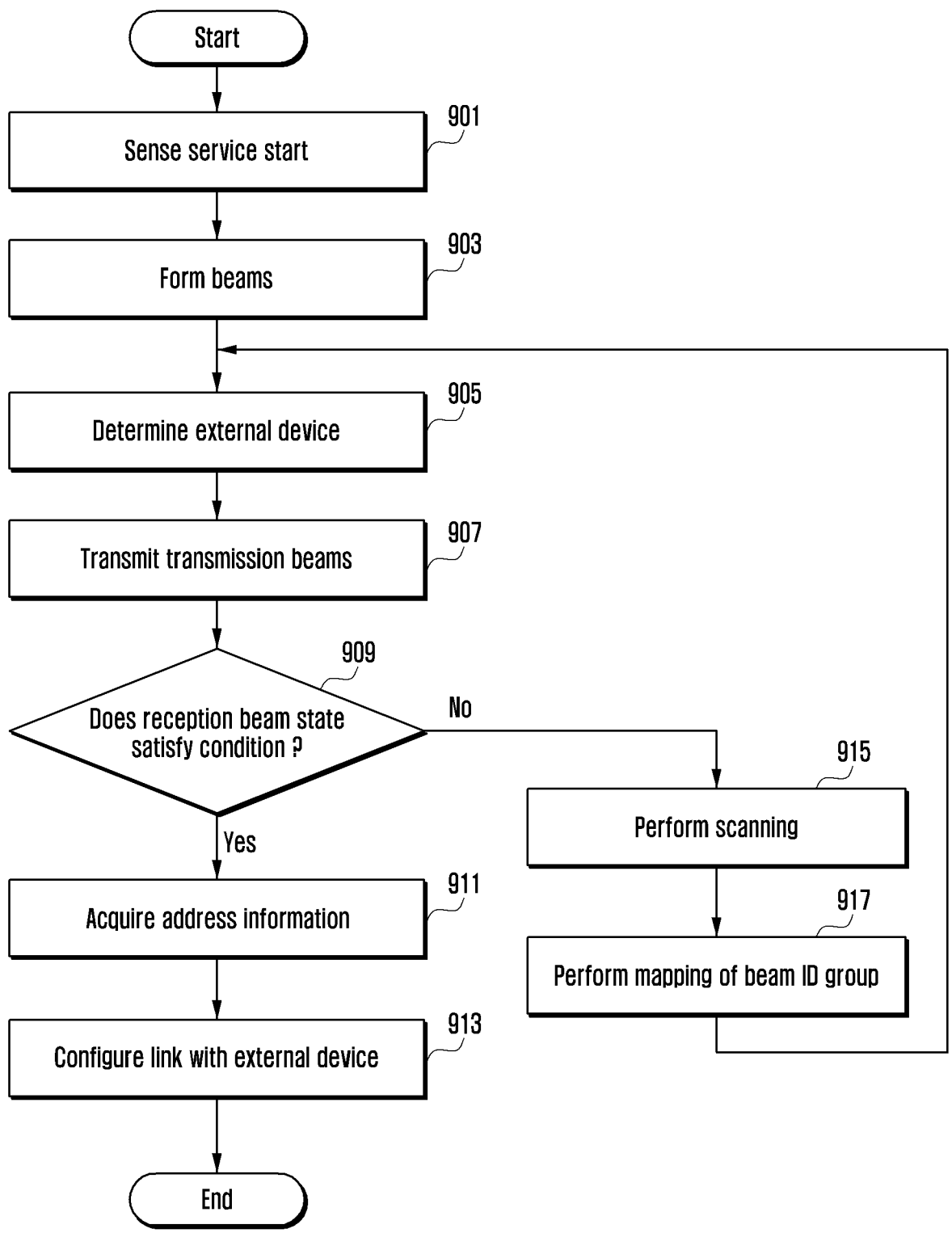
FIG. 9 is a flowchart illustrating a method for operating an electronic device according to an embodiment.

FIG. 9 is a flowchart illustrating a method for operating an electronic device according to an embodiment.

According to an embodiment, FIG. 9 may show an operational example in which the electronic device scans for an additional external device based on the response of the external device.

With reference to FIG. 9, at operation 901, the processor 120 of the electronic device 101 may sense a start of a service. According to an embodiment, the service may be started by a user-intended (or explicit) service start input (e.g., when the user initiates a pairing function or application), may be automatically started by the electronic device 101 based on various pieces of situation information (sensing information), or may be automatically started when the electronic device 101 is powered on (e.g., power-on of the smart glasses (or HMD)).

At operation 903, the processor 120 may form the beam based on an initial setup condition. According to an embodiment, the processor 120 may determine the initial setup condition related to the beam based on the sensing of the service start. In an embodiment, the initial setup condition may include, for example, the direction (or view direction) of the electronic device 101 corresponding to the user's eyesight direction, specific angle (e.g., beam direction), specific intensity (e.g., beam intensity), and/or specific width (e.g., beam width).

At operation 905, the processor 120 may determine the external device. According to an embodiment, the processor 120 may transmit the transmission (TX) beam to the external device for communication setup with the external device, where the TX beam has the beam direction and beam width that are configured based on the initial setup condition. According to an embodiment, the processor 120 may determine the target external device for transmitting the transmission beam thereto. For example, the processor 120 may determine another electronic device as the target external device for the transmission beam, in addition to the previously described external device. The other electronic device may have a specific angle and/or a specific distance with respect to the beam formed based on the initial setup condition. According to an embodiment, the processor 120 may determine the external device intended for pairing based on the distance between the electronic device 101 and the external device, and the operation of determining the external device based on the distance will be described with reference to FIGS. 10A and 10B.

At operation 907, the processor 120 may transmit the transmission (TX) beam to the determined external device. According to an embodiment, the processor 120 may transmit the transmission beam based on the direction of the electronic device 101, and it may monitor the reception (RX) beam that is transmitted in turn based on the transmission of the transmission beam. According to an embodiment, when forming the beam, the external device may feed information necessary for the pairing (e.g., device identifier and/or address information) (or channel information) to the electronic device 101, and the processor 120 may use the wireless communication module to transmit the wakeup signal on the transmission beam to be transmitted.

At operation 909, the processor 120 may determine whether the state of the reception beam satisfies a designated condition. According to an embodiment, the processor 120 may monitor the reception (RX) beam from the external device. For example, the processor 120 may receive response signals from the external device or another external device (e.g., another electronic device), and it may determine whether the signal intensities of the received response signals are higher than a designated intensity of a reference signal. According to an embodiment, if the signal intensity of a received response signal is higher than the intensity of the reference signal, the processor 120 may determine that the state of the reception beam from that particular external device satisfies the condition. According to an embodiment, if the response signal is not received, or the signal intensity of the received response signal is lower than the intensity of the reference signal, the processor 120 may determine that the state of the reception beam from that particular external device does not satisfy the condition.

At operation 909, if the state of the reception beam satisfies the designated condition (e.g., "Yes" of operation 909), the processor 120, at operation 911, may acquire information for communication (e.g., pairing) setup (e.g., device identifier and/or address information) based on the response signal (e.g., reception beam) received from the external device.

At operation 913, the processor 120 may set up a link to for pair with the external device.

For example, the processor 120 may set up a communication link (e.g., pairing) with the corresponding external device based on the acquired address information of the external device.

At operation 909, if the state of the reception beam does not satisfy the designated condition ("No" of operation 909), the processor 120, at operation 915, may perform a scan operation. According to an embodiment, the processor 120 may scan for another external device that it can communicate with and proceed to connect to the other external device. In an embodiment, the scan operation may include, for example, a beam sweeping operation. For example, the processor 120 may transmit the transmission (TX) beam for scanning the other external device, and it may identify the corresponding response. According to an embodiment, the operation of scanning the external device will be described later with reference to FIG. 11. At operation 917, the processor may perform mapping of a beam ID group. According to an embodiment, based on the result of the scan, the processor 120 may identify the beam ID transmitted from at least one external device that transmits the response signal, and it may include the identified beam ID in a mapping table. For example, the processor 120 may identify the distance from and/or the location of at least one external device by identifying the response signal corresponding to the transmission beam, and it may identify the beam ID and create (or update) and manage the mapping table in order to identify the best beam. An example of the beam ID and the mapping table according to an embodiment is disclosed in Table 1 below.

TABLE 1

| Beam ID | Device |
| --- | --- |
| x | First external device |
| y | N/A |
| z | Second external device |

According to an embodiment, with reference to Table 1, the processor 120 may transmit the transmission beam in order to scan for external devices, and it may identify the distance from and/or the location of the at least one external device. The processor 120 may identify the beam ID and create the mapping table (e.g., Table 1) in order to determine (or identify) the best beam corresponding to the distance and/or the location of the external device. According to an embodiment, if the user uses the electronic device 101 (e.g., wears the smart glasses) and changes (e.g. moves) the location of the electronic device 101, or if the direction (e.g., view direction) of the electronic device 101 is changed in accordance with the motion of the user (e.g., motion of the head (or view direction)), the processor 120 may re-perform the scan operation of the external device at least based on the predetermined setting, and it may update the mapping table accordingly.

Figure 10A:
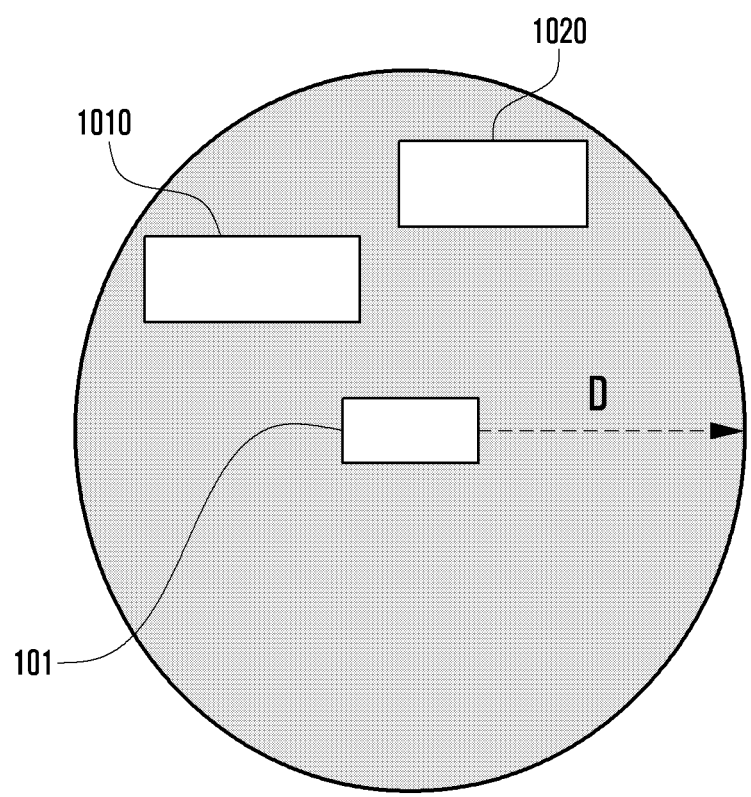
FIG. 10A is a diagram explaining an example in which an electronic device determines an external device for communication setup according to an embodiment.
Figure 10B:
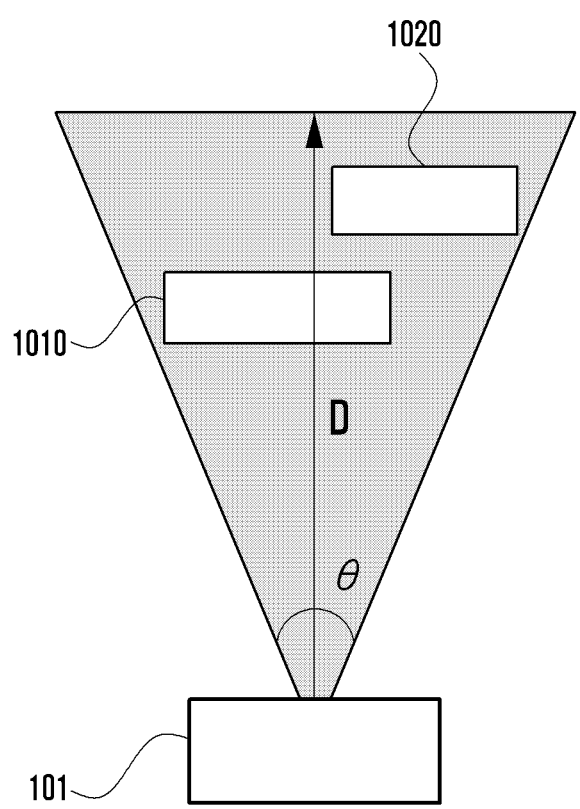
FIG. 10B is a diagram explaining an example in which an electronic device determines an external device for communication setup according to an embodiment.

FIGS. 10A and 10B are diagrams explaining an example in which an electronic device determines an external device for communication setup according to an embodiment.

According to an embodiment, the electronic device 101 may transmit the transmission (TX) beam to the external device for communication setup, where the TX beam has beam direction and beam width configured based on the initial setup condition. According to an embodiment, the electronic device 101 may include an operation of determining a target external device for transmitting the transmission beam. For example, the electronic device 101 may determine the external device that is within a specific angle and/or a specific distance from the beam formed based on the initial setup condition as the target device for the transmission beam. Accordingly, the electronic device 101 may determine the external device for the communication setup based on distance. For example, the electronic device 101 may determine the external device that is within the specific angle and/or the specific distance from the transmission beam in accordance with the initial setup condition as the target device for the communication setup, and it may receive the response signal after transmission of the transmission beam to the external device. In an embodiment, the operation of determining the external device based on distance will be described with reference to FIGS. 10A and 10B.

With reference to FIG. 10A, the electronic device 101 may identify the distance of the first external device 1010 and/or the second external device 1020 based on another wireless communication protocol (e.g., Bluetooth low energy (BLE)). According to an embodiment, the reaching distance D of the BLE signal may be based on the BLE transmission power. For example, if the transmission power is changed, the reaching distance D may be changed. According to an embodiment, in the case of transmitting the BLE signal with a specific transmission power, if there are external devices 1010 and 1020 that respond to the BLE signal, the electronic device 101 may determine that the corresponding external devices 1010 and 1020 are located within the reaching distance D.

With reference to FIG. 10B, the electronic device 101 may identify whether the first external device 1010 and/or the second external device 1020 are located within the specific distance and the specific angle based on a broad beam (e.g., broad radiation pattern or broad beam 551 in FIG. 5). According to an embodiment, the distance may be determined, for example, based on the transmission power in the same manner as the BLE of FIG. 10A. Further, the distance may be determined through adjustment of the number of antenna elements used for (or participating in) the transmission of the transmission beam (e.g., adjustment of a beamforming gain). According to an embodiment, the angle may be identified, for example, through a beam forming width θ. For example, the electronic device 101 may adjust the beam forming width θ through adjustment of the number of participating antenna elements during the beamforming. According to an embodiment, if the signal (e.g., transmission beam) is transmitted with a specific transmission power and beamforming width θ and there exist the external devices 1010 and 1020 responding to the signal, the electronic device 101 may determine that the corresponding external devices 1010 and 1020 are located within the reaching distance D and the beam forming width θ.

According to an embodiment, the electronic device 101 may receive the response signal from the first external device 1010 and/or the second external device 1020 based on the above-described determination, and if the intensity of the received response signal is weaker than the designated intensity of the reference signal, or if the response signal is not received from at least one external device, the electronic device 101 may scan (e.g., perform transmission (TX) beam sweeping) for other communicable external devices. Examples thereof are illustrated in FIG. 11.

Figure 11:
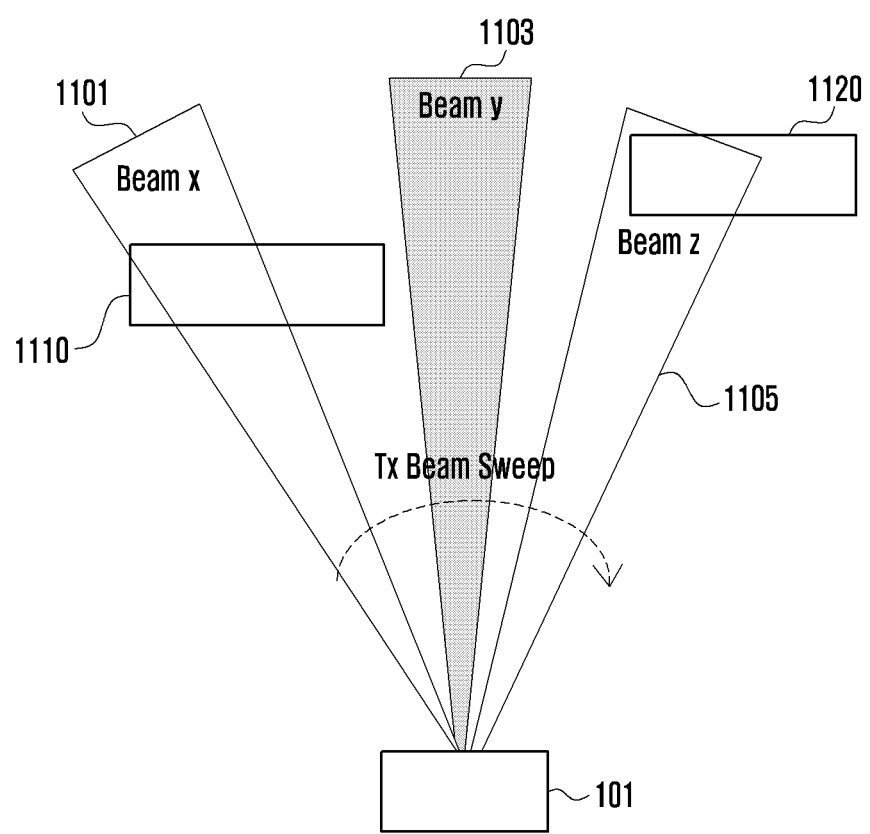
FIG. 11 is a diagram explaining an example in which an electronic device scans for an external device according to an embodiment.

FIG. 11 is a diagram explaining an example in which an electronic device scans for an external device according to an embodiment.

According to an embodiment, FIG. 11 shows an example in which the electronic device 101 scans for the communicable external device based on the transmission (TX) beam sweeping.

With reference to FIG. 11, the electronic device 101 may transmit the transmission (TX) beam 1103 using a beam ID y for forming a beam in a front direction to which the electronic device 101 is directed, and it may perform the transmission beam sweeping if no response corresponding to the transmission beam 1103 is received.

According to an embodiment, as illustrated in FIG. 11, an external electronic device may not exist in the front direction of the electronic device 101 (e.g., direction of the transmission beam 1103). Instead, the external device (e.g., first external device 1110 or the second external device 1120) may exist in another direction or location. For example, the first external device 1110 may be located within the reaching distance and the beam forming width of the transmission beam 1105 corresponding to the beam ID x, and the second external device 1120 may be located within the reaching distance and the beam forming width of the transmission beam 1105 corresponding to the beam ID z. In this case, the electronic device 101 may acquire the response from the first external device 1110 through the transmission beam 1101 corresponding to the beam ID x, and it may acquire the response from the second external device 1120 through the transmission beam 1105 corresponding to the beam ID z.

According to an embodiment, the electronic device 101 may perform the transmission beam sweeping (or scan) using the power determined by the distance discrimination operation as illustrated in FIG. 10A and/or FIG. 10B. For example, when BLE having reaching distance D is used, the electronic device 101 may perform omnidirectional transmission beam sweeping (or scan). The power of the transmission beam sweeping may also correspond to the reaching distance D. As another example, when a broad beam having reaching distance D and a beam width is used, the electronic device 101 may perform transmission beam sweeping (or scan) at an angle within the broad beam width.

According to an embodiment, the transmission (TX) beam may be transmitted to scan for the communicable external devices as described above, and information, such as the distances and the locations of the external devices, may be identified through identification of the response in accordance with the transmission beam. According to an embodiment, in order to identify the best beam that matches the identified information (e.g., distance and the location of the external device), the electronic device 101 may create a mapping table in which external devices are mapped onto beam IDs, respectively, as shown in Table 1. According to an embodiment, if the user who uses the electronic device 101 moves to change his/her location, or if the direction (e.g., front direction) of the electronic device 101 is changed in accordance with the user's motion, the electronic device 101 may re-perform the scan, and it may update the mapping table based on the result of the scan.

Figure 12:
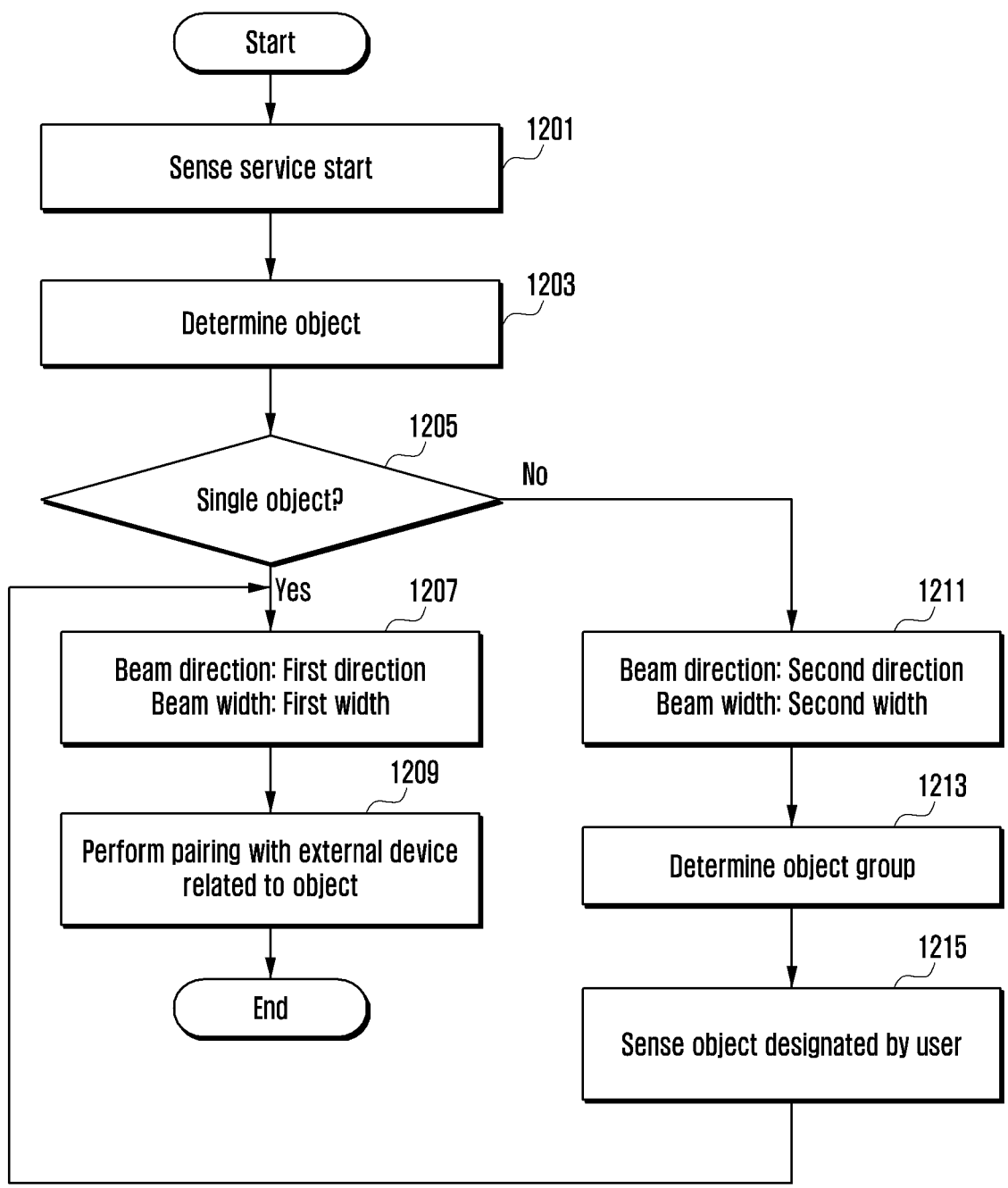
FIG. 12 is a flowchart illustrating a method for operating an electronic device according to an embodiment.
Figure 13:
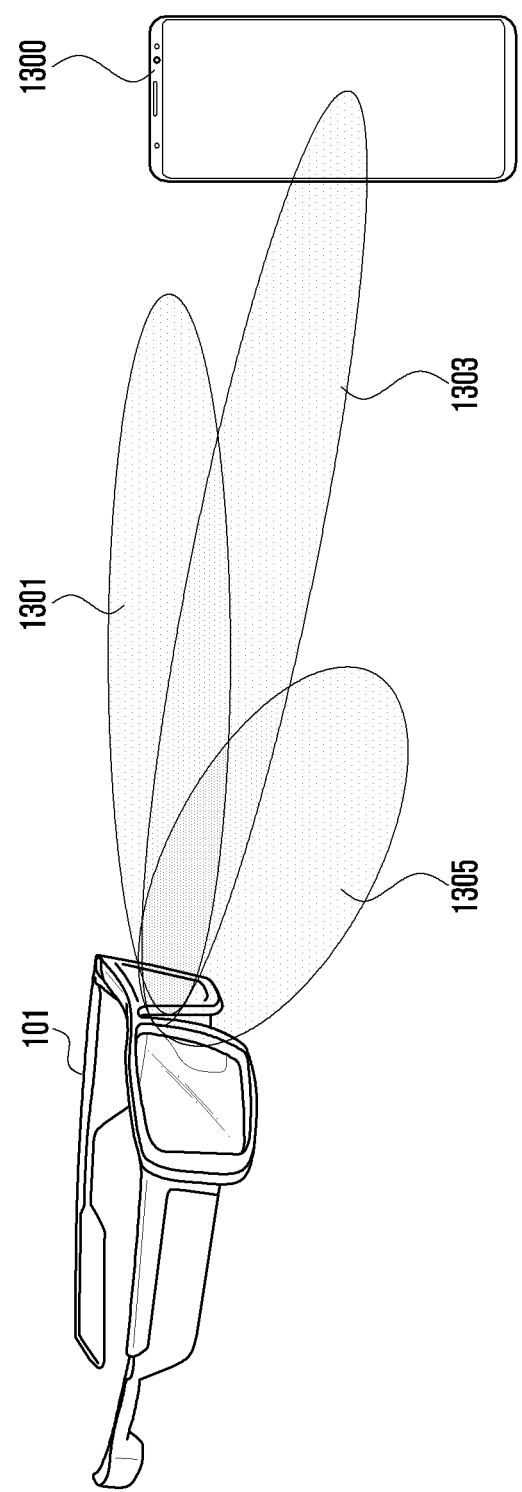
FIG. 13 is a diagram illustrating an example in which an electronic device adjusts a direction and a width of a beam according to an embodiment.

FIG. 12 is a flowchart illustrating a method for operating an electronic device according to an embodiment, and FIG. 13 is a diagram illustrating an example in which an electronic device adjusts a direction and a width of a beam according to an embodiment.

According to an embodiment, FIGS. 12 and 13 may illustrate an example in which an external device is selected and determined for pairing based on a preview image captured by the electronic device, and the direction and width of a beam is adjusted to select the external device.

With reference to FIG. 12, at operation 1201, the processor 120 of the electronic device 101 may sense a start of a service. According to an embodiment, the service may be started by a user-intended (or explicit) service start input (e.g., when the user initiates a pairing function or application), may be automatically started by the electronic device 101 based on various pieces of situation information (sensing information), or may be automatically started when the electronic device 101 is powered on (e.g., power-on of the smart glasses (or HMD)).

At operation 1203, the processor 120 may determine an object. According to an embodiment, the processor 120 may identify at least one object related to the external device based on a preview image captured by the electronic device 101 during the service start. According to an embodiment, when starting the service, the processor 120 may display the preview images corresponding to the direction (e.g., front direction) of the electronic device 101 on the display (e.g., display device 160 of FIG. 1) of the electronic device. According to an embodiment, the processor 120 may determine the object included in the preview images. According to an embodiment, the object may include an object related to at least one external device on which the user keeps an eye based on the real world or an image on the display.

At operation 1205, the processor 120 may determine whether the object is a single object or a plurality of objects based on the result of determining the object. For example, the processor 120 may identify the object related to the external device in a preview provided on the display, and it may determine the number of identified objects.

At operation 1205, if the object is a single object (e.g., "Yes" of operation 1205), the processor 120, at operation 1207, may determine (or set) the beam direction as a first direction, and it may determine (or set) the beam width as a first width. According to an embodiment, based on the location of the single object (or target object), the processor 120 may form the beam having the beam direction concentrated on the single object and the sharpened beam width (e.g., beam 553 of a narrow radiation pattern (or narrow beam)) so that the single object is located (or included) in the beam reaching distance and the beam width based on the location of the signal object (or target object).

At operation 1209, the processor 120 may perform pairing with the external device related to the object. According to an embodiment, the processor 120 may transmit the transmission beam formed in the first direction with the first width to the external device related to the object, and it may communicate with the external device based on the response of the external device.

At operation 1205, if the object is not a single object (e.g., "No" of operation 1205), for example, if the object corresponds to multiple objects, the processor 120, at operation 1211, may determine (or set) the beam direction as a second direction, and it may determine (or set) the beam width as a second width. According to an embodiment, the processor 120 may form the beam having a broadened beam width (e.g., beam 551 of a broad radiation pattern (or broad beam) of FIG. 5) so that the beam direction corresponds to the user's eyesight direction (e.g., front direction to which the electronic device 101 is directed) and the multiple objects are located (or included) in the beam width.

At operation 1213, the processor 120 may determine (or form) an object group.

According to an embodiment, the processor 120 may determine the multiple external devices (e.g., plurality of external devices) related to the multiple objects as a pairing target group.

At operation 1215, the processor 120 may sense an object designated by the user.

According to an embodiment, the processor 120 may determine the object designated by the user among the objects of the object group as the pairing target object. According to an embodiment, the user designation may include user inputs, such as designation by user's eyesight and/or designation by user's touch. As an example, the processor 120 may determine in which direction the user is looking among the multiple objects by tracking the user's pupil direction (or direction of the eyesight) based on the multiple objects displayed on the display (e.g., display device 160 of FIG. 1), and it may identify the object located in the direction of the tracked eyesight. In another example, the processor 120 may identify the object selected (e.g., touched) by the user among the multiple objects displayed on the display.

According to an embodiment, the processor 120 may proceed with operation 1207 based on the sensing of the object designated by the user among the multiple objects at operation 1215, and it may perform the following operations subsequent to operation 1207.

According to an embodiment, as shown in FIG. 12, the beam may be determined (or formed) in accordance with the number of the objects. According to an embodiment, in FIG. 12, it may be assumed that the electronic device 101 is smart glasses (or HMD). In an embodiment, the electronic device 101 may determine the object based on information acquired (or received) through a camera module (e.g., camera module 180 of FIG. 1). For example, the information acquired through the camera module 180 may include various pieces of information, such as eye tracking information, vision information, user's motion information, motion information of the electronic device 101, critical time when the user is looking at the object, and/or critical time when the motion of the user/electronic device 101 is maintained to a specific degree or less, and the electronic device 101 may determine the object at which the user is looking in accordance with the various pieces of acquired information.

According to an embodiment, if the object at which the user is looking (e.g., object input to the camera module 180) is a single object, the electronic device 101 may transmit the transmission beam for pairing with the single object (e.g., external device), and it may subsequently perform the pairing. For example, if a single external device is determined as the target device intended to be connected to the electronic device, the electronic device 101 may adjust the beam direction to the direction of the external device for communication with the external device, and it may adjust the beam width to be relatively sharpen or narrow. In the example shown in FIG. 13, the electronic device 101 may adjust the beam width to a relatively sharpened beam width (e.g., 1303) based on the reaching distance through adjustment of the beam direction toward the external device 130 that is the single object.

According to an embodiment, if the object at which the user is looking (e.g., object input to the camera module 180) is multiple objects, the electronic device 101 may adjust the beam width to be relatively broad with respect to the multiple objects, and based on this, the electronic device 101 may determine the group of the objects. In the example shown in FIG. 13, if the multiple objects exist, the electronic device 101 may adjust the beam direction to be the direction of the user's eyesight (e.g., front direction of the electronic device 101), and it may adjust the beam width to a relatively broadened beam width (e.g., 1301 or 1303). According to an embodiment, if any one object among the multiple objects is designated by the user, the electronic device 101 may adjust the beam direction and the beam width (e.g., forming of the transmission beam having the sharpening beam width (e.g., 1301) in accordance with the direction and the reaching distance of the external device 1300) for the pairing (or communication connection) with the external device (e.g., external device 1300) of the corresponding object.

Figure 14:
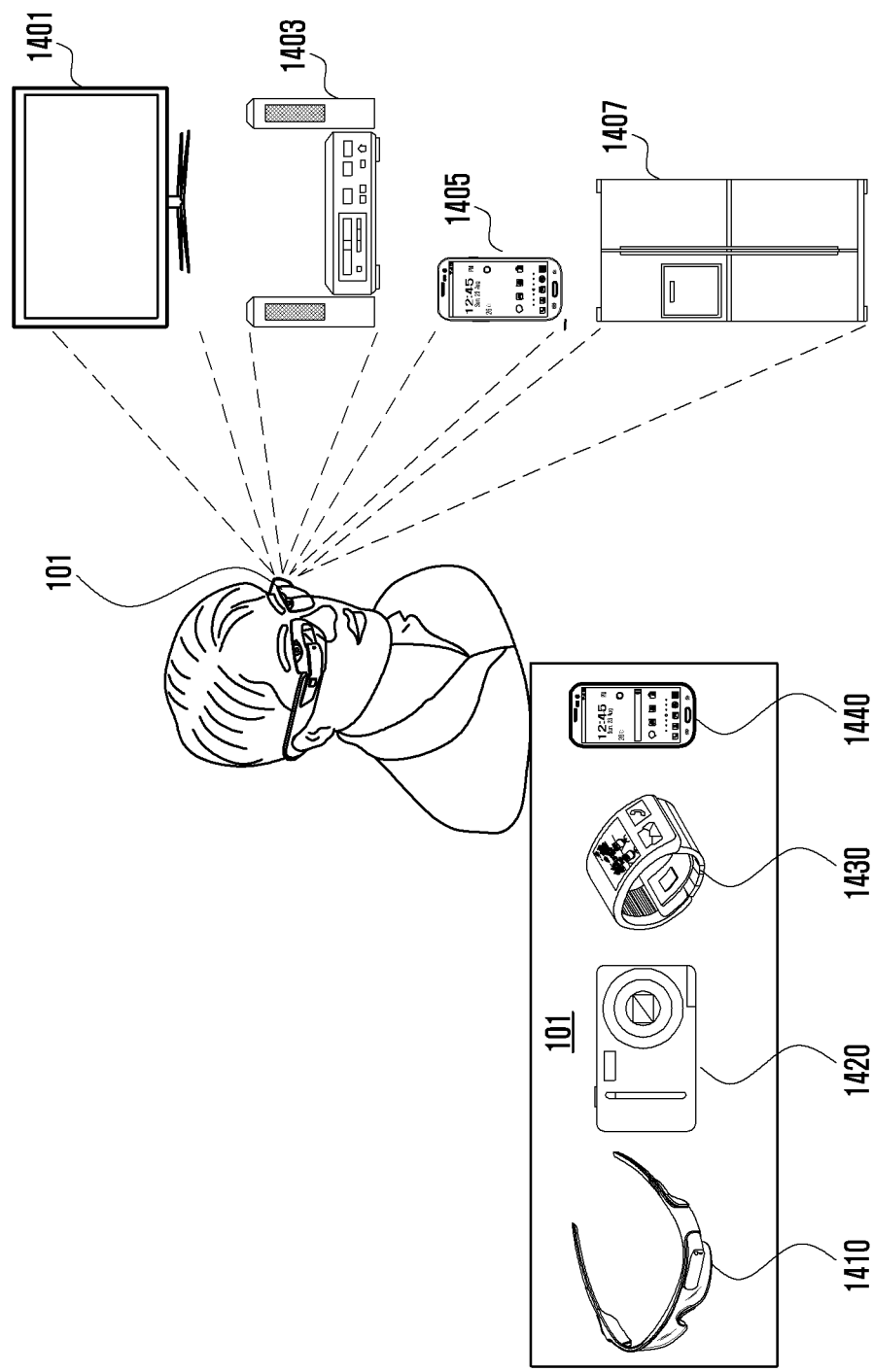
FIG. 14 is a diagram illustrating an example in which an electronic device performs pairing with an external device according to an embodiment.

FIG. 14 is a diagram explaining an example in which an electronic device performs pairing with an external device according to an embodiment.

With reference to FIG. 14, a user may perform pairing with other neighboring electronic devices (hereinafter, referred to as "external devices") 1401, 1403, 1405, and 1407 using the electronic device 101. For example, the electronic device 101 may identify a device that can be wirelessly connected to the external device, such as smart glasses 1410 (or HMD), camera 1420 (e.g., digital camera or smart camera), wearable device 1430, and smart phone 1440. According to an embodiment, the electronic device 101 may support beamforming technology, support a glass-like device (e.g., smart glasses 1410) capable of specifying the external device by controlling the beam in a direction indicated by eye tracking using beamforming technology. Alternatively, the electronic device 101 may be a device (e.g., smart phone 1440) capable of specifying the external device by controlling the beam in a direction as indicated by a user touch input.

According to an embodiment, the electronic device 101 may identify the external device included in an input image, and it may perform pairing with the identified external device. In an embodiment, identifying the external device may be identifying whether there is the external device that transmits the response corresponding to the transmission beam. For example, the external device may be a device capable of performing direct communication with the electronic device 101 based on the beam. For example, the external device may be a device that can be wirelessly connected to the electronic device 101, such as display device 1401 (e.g., TV), audio device 1403, smart phone 1405, or home appliance 1407 (e.g., refrigerator, washing machine, or microwave oven). According to an embodiment, the external device may further include a remote controller or wearable device in addition to the illustrated devices.

In an embodiment, that the electronic device 101 and the external device perform pairing with each other may mean, for example, that the electronic device 101 is wirelessly connected to the external device, or it may mean that the electronic device 101 performs the setup for wirelessly transmitting and receiving data with the external device.

According to an embodiment, the electronic device 101 may omit an image processing procedure as compared with the scheme for designating a pairing target based on an image, and it may specify the external device subject to connection although various pieces of information (e.g., identification information) of the external device intended to be connected is not pre-registered.

According to an embodiment, the electronic device 101 may identify the external device related to an object in an image by identifying the object included in the image on the display. In an embodiment, the object may be information on the external device acquired from the currently input image, and the external device subject to pairing may be an external device having transmitted the response signal corresponding to the transmission beam of the electronic device 101 among the external devices of the objects.

According to an embodiment, the electronic device 101 may perform pairing with the corresponding external device using the acquired address information of the external device. In an embodiment, the address information may be necessary information for the electronic device 101 and the external device to perform the pairing. For example, the address information may include a MAC address of the external device and/or an IP address. According to an embodiment, the electronic device 101 may transmit the transmission beam to the external device, and it may acquire the address information of the external device based on the reception of the response signal (e.g., reception beam) corresponding to the transmission beam from the external device. The electronic device 101 may perform the pairing with the external device using the acquired address information.

According to an embodiment, after completion of the pairing, the electronic device 101 may control the corresponding external device. In an embodiment, the completion of the pairing may indicate the state where the electronic device 101 can transmit data (e.g. payload data) to the external device. In an embodiment, controlling the external device may mean that the external device operates in accordance with the data transmitted from the electronic device 101. For example, in the example shown in FIG. 14, the electronic device 101 performs pairing with the external device, such as the display device 1401, audio device 1403, smart phone 1405, or refrigerator 1407.

According to an embodiment, the electronic device 101 may control the paired electronic appliance using an input device of the electronic device 101. For example, the electronic device 101 may adjust the function (e.g., channel or volume) of the paired external device using the input device of the electronic device 101. In an embodiment, the input device may be a device capable of receiving user's instructions. For example, the input device may be a button, touch panel, camera, microphone, keyboard, or mouse of the electronic device 101.

According to an embodiment, the electronic device 101 may display a screen including the external device subject to pairing (e.g., preview screen including the object) through the display (e.g., display device 160 of FIG. 1). According to an embodiment, the screen displayed on the electronic device 101, as shown in the examples of in FIG. 15 or 16, may include a preview image acquired through the camera module 180 of the electronic device 101 in the user's eyesight direction (or front direction of the electronic device 101) based on the shape of the display in accordance with the kind of the electronic device 101 (e.g., smart glasses or smart phone). According to an embodiment, the screen being displayed through the display of the electronic device 101 may include a single object or an object group of multiple objects.

According to an embodiment, the electronic device 101 may identify beam forming information, such as direction, reaching distance, and/or angle of the external device included in the image, may transmit the transmission beam to the external device based on the identified beam forming information, and may perform or may not perform pairing with the corresponding external device based on whether the external device has responded to the transmission beam.

Figure 15:
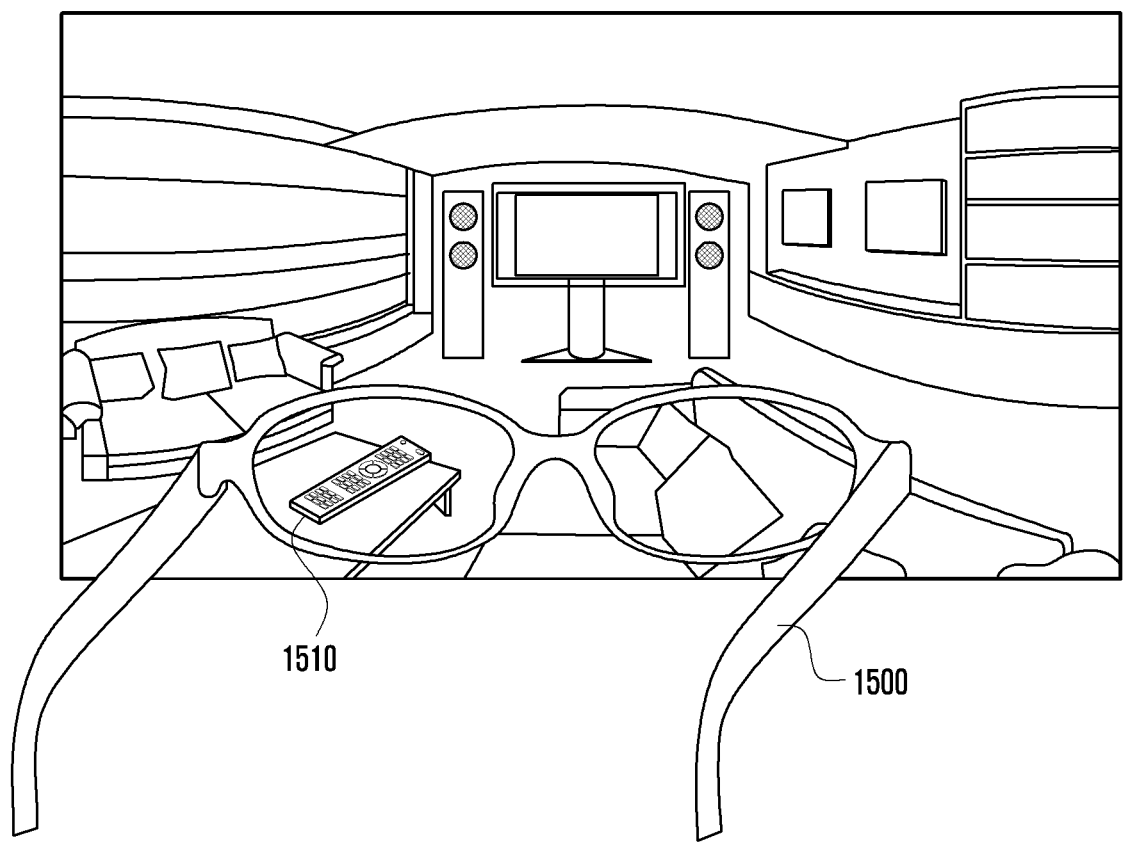
FIG. 15 is a diagram illustrating an electronic device and a preview image displayed on a display of the electronic device according to an embodiment.
Figure 16:
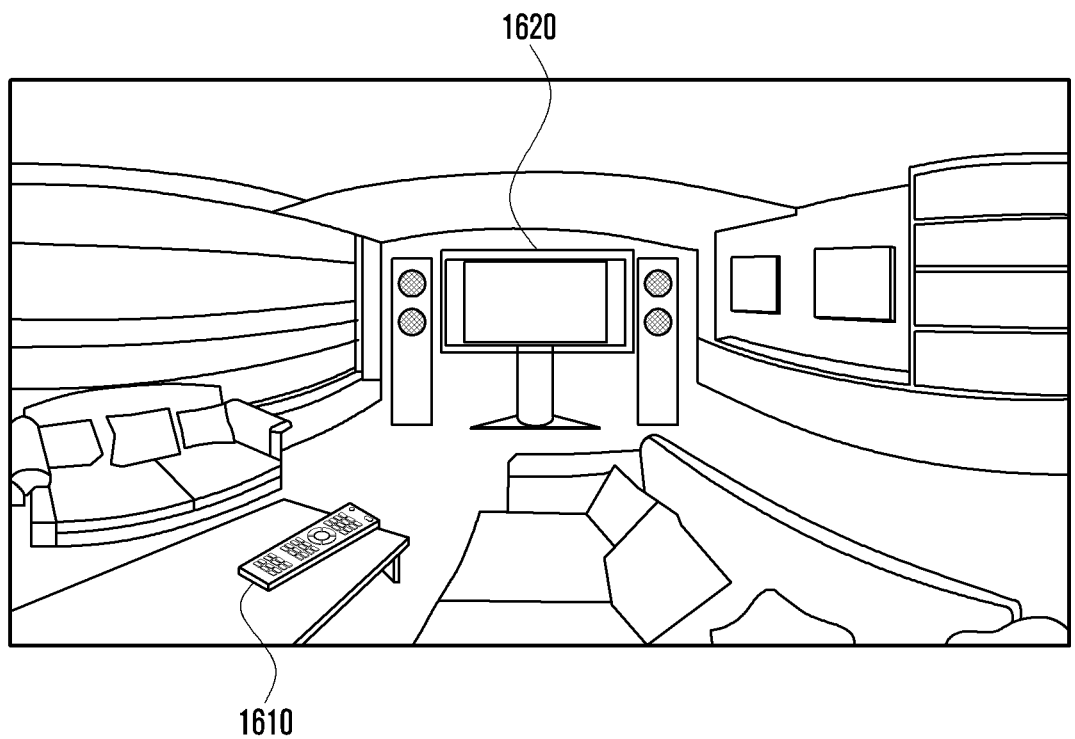
FIG. 16 is a diagram illustrating an electronic device and a preview image displayed on a display of the electronic device according to an embodiment.
Figure 16:
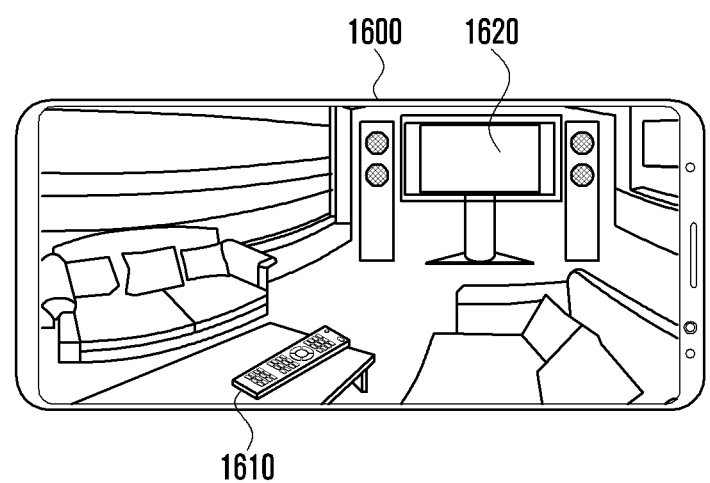

FIGS. 15 and 16 are diagrams illustrating an electronic device and preview images being displayed through a display of the electronic device according to an embodiment.

In the example of FIG. 15, the electronic device 101 is smart glasses 1500. As illustrated in FIG. 15, a preview image may be displayed through the display of the smart glasses 1500, where the preview image is an image of the electronic device's surroundings. The external device subject to pairing may be selected based on an object 1510 included in the preview image. For example, if it is determined that the user is looking in the same direction for a predetermined time, the smart glasses 1500 may determine the external device located in the user's eyesight direction as a target device for pairing, and it may transmit the transmission beam to the external device 1510. According to an embodiment, if it is determined that the camera module 180 is under operation and an image of the same object 1510 is input for a predetermined time, the electronic device may determine the external device of the object 1510 included in the input image as the pairing target device, and it may transmit the transmission beam to the corresponding external device. According to an embodiment, the electronic device 101 may indicate whether to perform pairing with the identified external device to the user. For example, in the case of FIG. 15, a case where a remote controller 1510 is included in the input image may be illustrated. The electronic device 101 may display the remote controller 1510 on the display, and it may receive, from the user, an input to perform pairing with the remote controller 1510. According to an embodiment, if an input to perform pairing with the remote controller 1510 is received from the user, the electronic device 101 may transmit the transmission beam to the remote controller 1510, and it may perform pairing with the remote controller 1510 based on the corresponding response.

In the example of FIG. 16, the electronic device 101 is a smart phone 1600. As illustrated in FIG. 16, a preview image may be displayed through a display of the smart phone 1600, and an external device subject to pairing among object groups 1610 and 1620 included in the preview image may be selected. For example, if the object groups 1610 and 1620 are included in the image acquired through the camera module 180, the smart phone 1600 may determine an external device that is located in the user's eyesight direction for a predetermined time or an external device that is selected (e.g., touched) by the user on the display as a target device for pairing, and it may transmit the transmission beam to the corresponding external device. According to an embodiment, the electronic device 101 may indicate whether to perform pairing with the identified external device to the user. For example, in the case of FIG. 16, a case where a remote controller 1610 and a TV 1620 are included in an input image may be illustrated. The electronic device 101 may display the remote controller 1610 and the TV 1620 on the display, and it may receive, from the user, an input selecting either the remote controller 1610 or the TV 1620 for pairing. For example, if an input to perform the pairing with the TV 1620 is received from the user, the electronic device 101 may transmit the transmission beam to the TV 1620 designated by the user among the external devices 1610 and 1620 of the object group, and it may perform the pairing with the TV 1620 based on the corresponding response.

Figure 17:
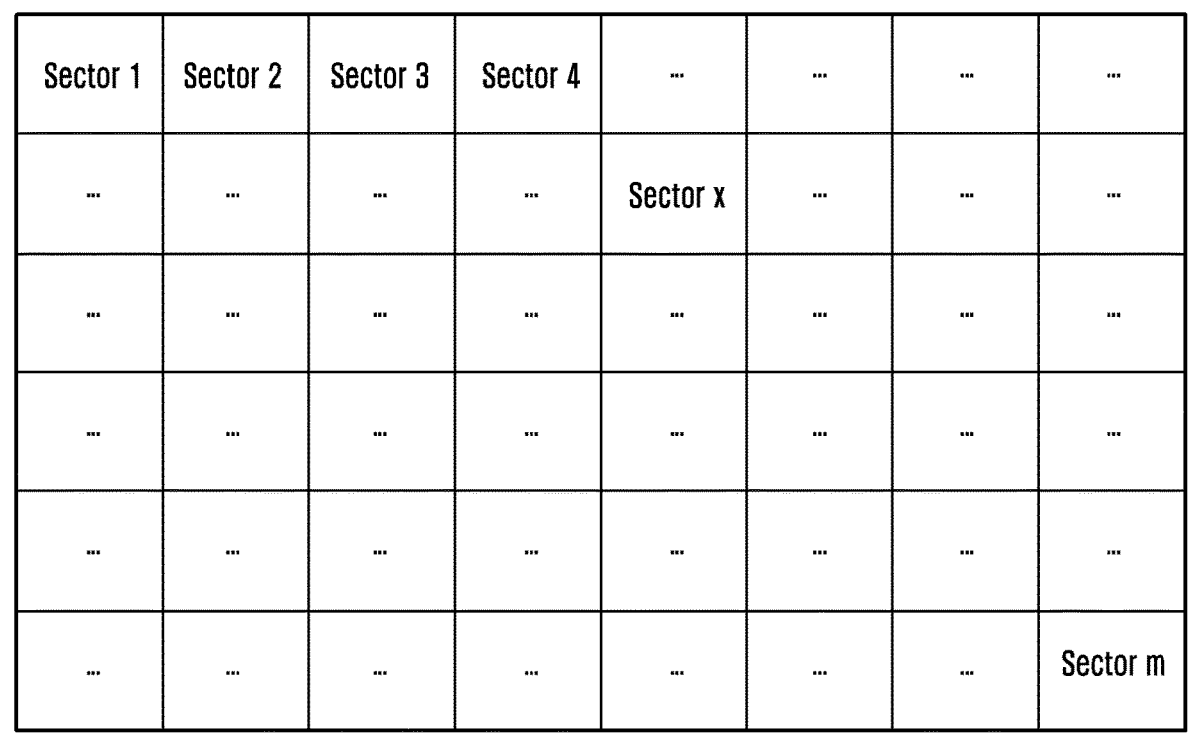
Figure 18:
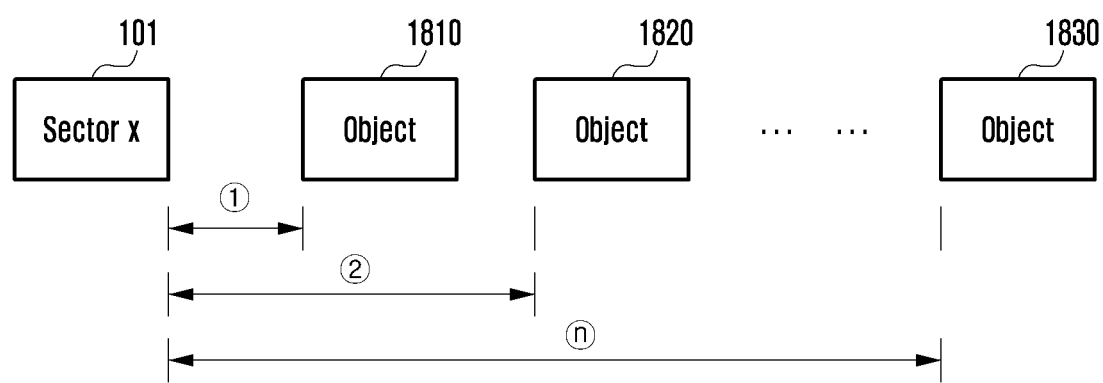
FIG. 18 is a diagram illustrating an example of distance setup for acquiring an optimum beam ID between an electronic device and an external device according to an embodiment.
Figure 19:
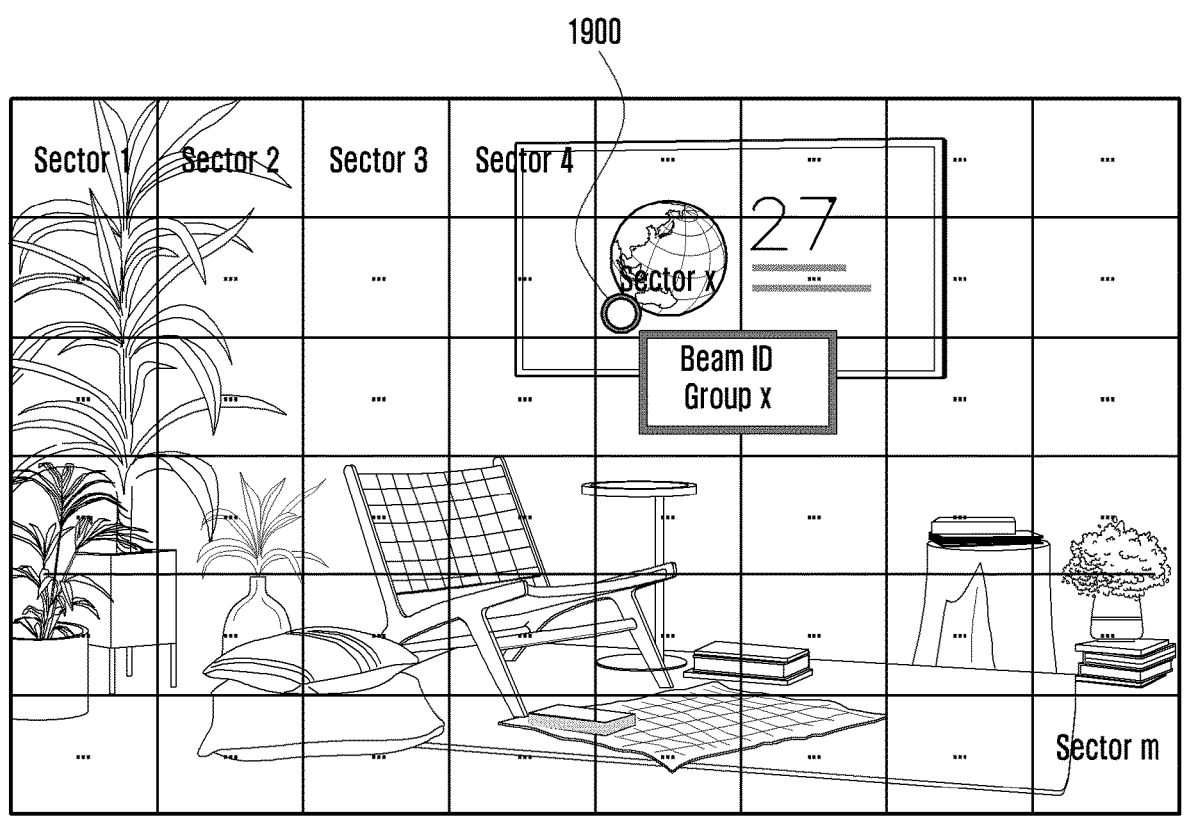
FIG. 19 is a diagram illustrating an example in which an electronic device performs mapping of a beam ID group on a space displayed on a display of an electronic device according to an embodiment.

FIGS. 17, 18, and 19 are diagrams explaining an example in which an electronic device sets an antenna element for the transmission beam according to an embodiment.

According to an embodiment, FIG. 17 illustrates an example of divided sectors on a 2D plane, which may be displayed on a display (e.g., display device 160 of FIG. 1) of an electronic device 10. FIG. 18 illustrates an example of distance setup for acquiring an optimum beam ID (or best beam) between an electronic device 101 and an external device, and FIG. 19 illustrates an example in which an electronic device 101 performs mapping of a beam ID group on a space displayed on a display of an electronic device 101.

FIG. 17 illustrates an example in which sector numbers (e.g., sector 1, sector 2, . . . , sector x, . . . , sector n) are designated with respect to respective divided spaces on a 2D plane that can be displayed on the display (e.g., display device 160 of FIG. 1) of the electronic device 101. At least one of antenna elements included in the electronic device 101 may be allocated for an antenna array (e.g., antenna 248 of FIG. 2, antenna array 330 of FIG. 3, or antenna array 515 of FIG. 5) with respect to the respective divided spaces. For example, the electronic device 101 may allocate beam IDs related to the beams having directions designated by sectors in accordance with the respective divided spaces.

FIG. 18 illustrates an example in which distances for acquiring optimum beam IDs between an electronic device 101 and an external device are set. With reference to FIGS. 17 and 18, in order to search for an optimum beam pattern in accordance with a distance between the electronic device 101 and an external device (e.g., first object 1810, second object 1820, or the n-th object 1830) with respect to a specific sector (e.g., sector x) in FIG. 17, the electronic device 101, as shown in FIG. 18, may perform mapping of distances between the electronic device 101 and the external device based on the sector number and the level of the reception (RX) power from the external device. The distances of the external devices corresponding to objects 1810, 1820, and 1830 from the electronic device (e.g., distance ①, distance ②, and distance ③) may be determined, and the electronic device may perform mapping of the distances between the electronic device 101 and the external device onto a group of sector beam IDs as exemplified in Table 2 below. The optimum beam pattern may correspond to the closest external device.

TABLE 2

|  | Distance | Beam ID |
|---|---|---|
| Sector x | ① | # 1 |
|  | ② | # 30 |
|  | . . . | . . . |
|  | ⓝ | # xx |

According to an embodiment, as shown in FIG. 19, if an input of a user designation is sensed at a point (e.g., sector x point) at which an object displayed on the display is located based on eye tracking information, sensor information, or touch information (e.g., touch point 1900 of FIG. 19), the electronic device 101 may determine the sector number (e.g., sector x) predefined with respect to the corresponding sector (e.g., sector at the touch point 1900 of FIG. 19) and the beam ID group (e.g., beam ID group x) allocated thereto, and it may form the beam in accordance with the beam ID corresponding to the beam ID group.

Figure 20:
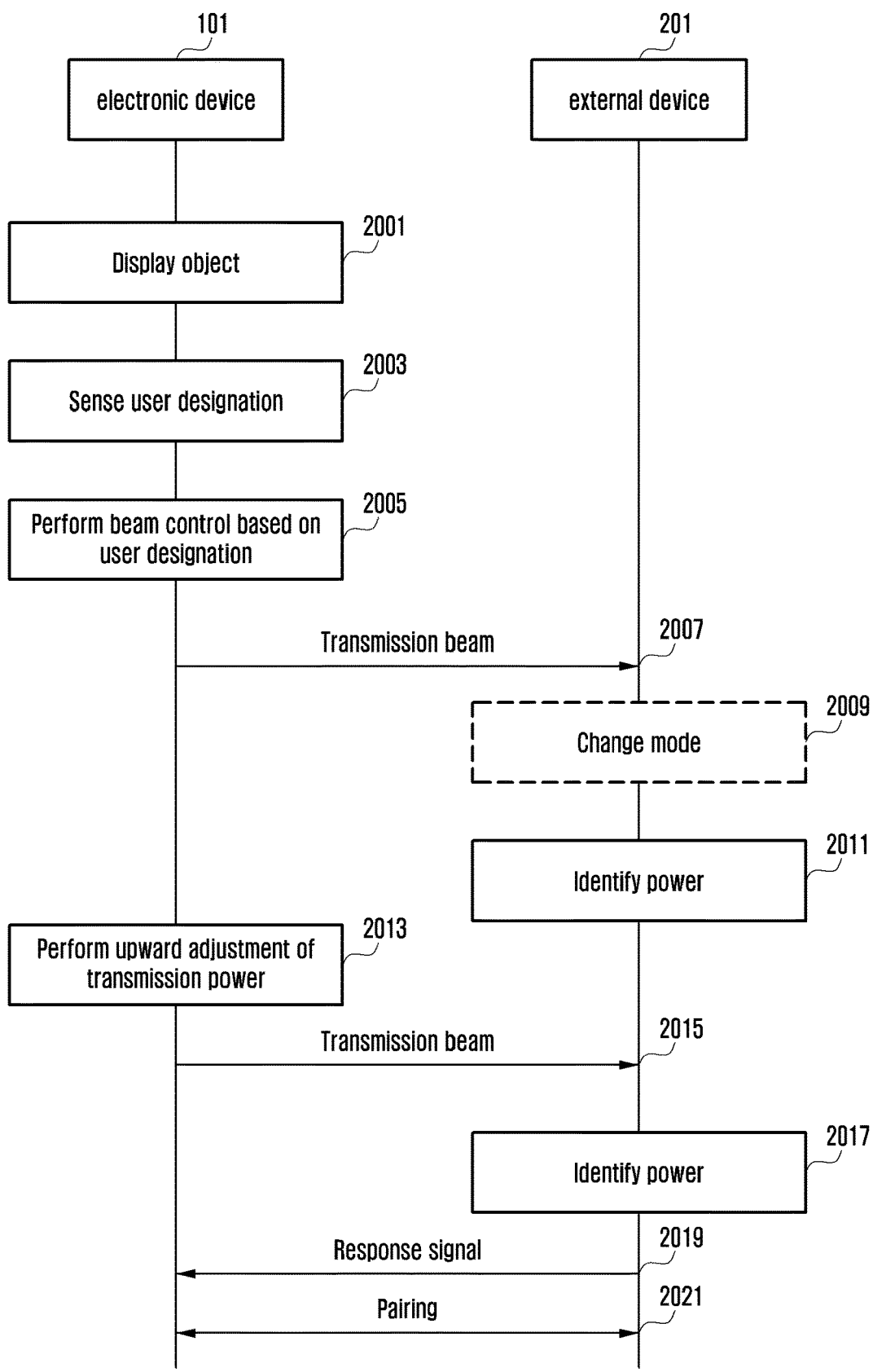
FIG. 20 is a diagram illustrating an operation method between an electronic device and an external device according to an embodiment.

FIG. 20 is a diagram illustrating an operation method between an electronic device and an external device according to an embodiment.

With reference to FIG. 20, at operation 2001, the electronic device 101 may display an image including an object correspond to an external device 201 through a display (e.g., display device 160 of FIG. 1).

At operation 2003, the electronic device 101 may sense a user designation. According to an embodiment, the electronic device 101 may identify an object designated by the user based on an image on the display. According to an embodiment, the user designation may include user inputs, such as designation by user's eyesight and/or designation by user's touch. As an example, the electronic device 101 may determine in which direction the user is looking by tracking the user's pupil eyesight direction, and it may identify the object located in the direction of the tracked eyesight. As an example, the electronic device 101 may identify the object selected (e.g., touched) by the user among the objects displayed on the display.

At operation 2005, the electronic device may control (or form) the beam based on the user designation. According to an embodiment, the electronic device 101 may not have information related to the distance from the object designated by the user. Accordingly, as described above with reference to FIGS. 17 to 19 and Table 2, the electronic device 101 may successively change the beam IDs using the predefined beam ID group with respect to the object designated by the user. According to an embodiment, as exemplified in FIG. 19, the electronic device 101 may determine the predefined sector number (e.g., sector x) and the beam ID group allocated thereto with respect to the sector corresponding to the point (e.g., sector x point) designated by the user on the display, and it may form the beam in accordance with the beam ID corresponding to the beam ID group.

At operation 2007, the electronic device 101 may transmit the transmission beam to the external device 201 based on the beam control. According to an embodiment, the electronic device 101 may transmit the beam in accordance with the beam ID based on the intensity and/or the width in accordance with the corresponding beam ID.

At operation 2009, when receiving the transmission beam transmitted from the electronic device 101, the external device 201 may perform a mode change operation. According to an embodiment, the external device 201 may be in a sleep mode, and it may wake up based on the reception of the transmission beam. For example, the external device 201 may be converted from the sleep mode to an active mode based on the transmission beam. According to an embodiment, operation 2009 is an optional operation, and for example, if the external device 201 is already in the active mode, operation 2009 may not be performed.

At operation 2011, the external device 201 may measure the power of the transmission beam transmitted from the electronic device 101. According to an embodiment, the external device 201 may determine whether to transmit the response signal to the electronic device 101 based on the level of the power of the transmission beam. For example, if the level of the power of the transmission beam is lower than a predetermined level (e.g., reference power level), the external device 201 may not transmit the response signal, whereas if the level of the power of the transmission beam is equal to or higher than the predetermined level, the external device 201 may transmit the response signal. According to an embodiment, in the example shown in FIG. 20, the power of the transmission power is lower than the predetermined level.

At operation 2013, the electronic device 101 may perform upward adjustment of the transmission power of the transmission beam (e.g., beam intensity). According to an embodiment, after the transmission of the transmission beam at operation 2007, if the response signal is not received from the external device 201 within a predetermined time, the electronic device 101 may perform upward adjustment of the beam intensity to a specific level. According to an embodiment, the electronic device 101 may increase the beam reaching distance as compared with the transmission beam at operation 2007 by increasing the beam intensity, and it may form the beam width to be relatively sharper.

According to an embodiment, the electronic device 101 may not receive the response signal if the response signal is not transmitted by the external device 201 based on the power of the transmission beam as at operation 2011. Alternatively, the external device 201 may not transmit the response signal if the external device 201 does not receive the transmission beam at all.

At operation 2015, the electronic device 101 may transmit the adjusted transmission beam to the external device 201. As described above, the electronic device 101 may transmit the transmission beam upwardly adjusted to a predetermined intensity.

At operation 2017, the external device 201 may measure the power of the transmission beam based on the reception of the transmission beam. According to an embodiment, the external device 201 may determine whether to transmit the response signal to the electronic device 101 based on the level of the power of the transmission beam. For example, if the level of the power of the transmission beam is lower than a predetermined level (e.g., reference power level), the external device 201 may not transmit the response signal, whereas if the level of the power of the transmission beam is higher than the predetermined level, the external device 201 may transmit the response signal. According to an embodiment, in the example shown at operation 2017 of FIG. 20, the power of the transmission beam is equal to or higher than the predetermined level.

At operation 2019, the external device 201 may transmit the response signal corresponding to the transmission beam of the electronic device 101 to the electronic device 101. According to an embodiment, if the transmission beam is received with the power of the predetermined level, the external device 201 may transmit the response signal (e.g., beam) to the electronic device 101.

At operation 2021, the electronic device 101 and the external device 201 may perform pairing with each other.

The electronic device 101 according to an embodiment of the disclosure may include an antenna array for beamforming (e.g., antenna 248 of FIG. 2, antenna array 330 of FIG. 3, or antenna array 515 of FIG. 5), and a method for operating the electronic device 101 may include forming and transmitting a beam corresponding to a direction of the electronic device based on a start of a service; monitoring reception of a response signal corresponding to the beam from at least one external device; and performing pairing with the at least one external device based on at least a part of the response signal when the response signal is received.

According to an embodiment of the disclosure, forming the beam may include forming the beam based on a direction and an intensity of the beam initially set during the start of the service.

According to an embodiment of the disclosure, performing the pairing may include acquiring address information related to the at least one external device from the response signal, and performing the pairing with the at least one external device based on the address information. According to an embodiment of the disclosure, forming the beam may include changing a direction or an intensity of the beam at least based on the response signal, and forming the beam at least based on the changed direction or intensity of the beam.

According to an embodiment of the disclosure, forming the beam may include displaying a plurality of sectors on a display of the electronic device, acquiring a user designation to select a sector among the plurality of sectors, and forming the beam based on a beam ID allocated to the sector.

Certain embodiments of the disclosure that are described in the specification and drawings are merely for easy explanation of the technical contents of the disclosure and proposal of specific examples to help understanding of the disclosure, but are not intended to limit the scope of the disclosure. Accordingly, it should be construed that all changes or modifications derived based on the technical concept of the disclosure are included in the scope of the disclosure in additions to the embodiments disclosed herein.

What is claimed is:

1. An electronic device comprising:
a display;
a wireless communication circuitry configured to provide wireless communication;
an antenna array including a plurality of antenna elements used for beamforming; and
at least one processor operatively connected to the wireless communication circuitry and the antenna array, wherein the processor is configured to:
display a plurality of sectors on the display,
detecting a selection of a sector from among the plurality of sectors,
form and transmit a beam corresponding to a direction of the electronic device based on a start of a service and a beam identification (ID) allocated to the selected sector,
monitor reception of a response signal corresponding to the beam from at least one external device, and
perform pairing with the at least one external device based on at least a part of the response signal if the response signal is received.

2. The electronic device of claim 1, wherein the processor is configured to form the beam at least based on a direction and an intensity of the beam initially set during the start of the service.

3. The electronic device of claim 1, wherein the processor is configured to:
acquire address information related to the at least one external device from the response signal, and
perform the pairing with the at least one external device based on the address information.

4. The electronic device of claim 1, wherein the processor is configured to change a direction or an intensity of the beam at least based on the response signal.

5. The electronic device of claim 1, wherein the processor is configured to change at least a part of a direction and an intensity of the beam if the response signal is not received from the at least one external device within a predetermined time after transmitting the beam.

6. The electronic device of claim 1, wherein the processor is configured to change at least a part of a direction or an intensity of the beam based on a user designation.

7. The electronic device of claim 1, wherein the processor is configured to:
allocate a sector number and an antenna element for each of the plurality of sectors on a two-dimensional (2D) plane displayed on the display, and
form the beam to have a direction corresponding to the sector number and the antenna element of the sector selected by the user designation.

8. The electronic device of claim 1, wherein the processor is configured to:
acquire a reception beam corresponding to the response signal transmitted from the at least one external device,
determine a state of the reception beam, and
scan for another external device if the state of the reception beam fails to meet a designated condition.

9. The electronic device of claim 8, wherein the processor is configured to scan for the other external device based on beam sweeping.

10. The electronic device of claim 9, wherein the processor is configured to:
   transmit the beam in a front direction in which the electronic device is directed,
   perform the beam sweeping if there is no response corresponding to the beam, and
   perform pairing with the other external device if a response is acquired from the other external device in response to the transmitted beam during the beam sweeping, wherein the other external device is transmitted the response in a direction of the transmitted beam.

11. The electronic device of claim 1, wherein the processor is configured to:
   display a preview image corresponding to the direction of the electronic device on a display of the electronic device based on the start of the service,
   identify an object related to the at least one external device in a direction of a user's eyesight based on the preview image,
   form a first beam in a first direction with a first width if the identified object is a single object, and
   form a second beam in a second direction with a second width if the identified object corresponds to multiple objects.

12. The electronic device of claim 11, wherein a radiation pattern of the first beam formed is relatively narrow compared to the second beam.

13. The electronic device of claim 1, wherein the electronic device is smart glasses comprising the antenna array and a display.

14. The electronic device of claim 1, wherein the electronic device is a smart phone comprising the antenna array, a display, and a camera module.

15. A method for operating an electronic device including an antenna array for beamforming, comprising:
   displaying a plurality of sectors on a display;
   detecting a selection of a sector from among the displayed plurality of sectors;
   forming and transmitting a beam corresponding to a direction of the electronic device based on a start of a service and a beam identification (ID) allocated to the selected sector;
   monitoring reception of a response signal corresponding to the beam from at least one external device; and
   performing pairing with the at least one external device based on at least a part of the response signal when the response signal is received.

16. The method of claim 15, wherein forming the beam comprises forming the beam based on a direction and an intensity of the beam initially set during the start of the service.

17. The method of claim 15, wherein performing the pairing comprises:
   acquiring address information related to the at least one external device from the response signal; and
   performing the pairing with the at least one external device based on the address information.

18. The method of claim 15, wherein forming the beam comprises:
   changing a direction or an intensity of the beam at least based on the response signal; and
   forming the beam at least based on the changed direction or intensity of the beam.

* * * * *